United States Patent
Kim et al.

(10) Patent No.: US 10,395,224 B2
(45) Date of Patent: Aug. 27, 2019

(54) FINANCIAL DEVICE HAVING A REPLACEABLE MODULE FOR PERFORMING REPLENISHMENT OR COLLECTION FUNCTION

(71) Applicant: ATEC AP CO., LTD., Seongnam-si, Gyeonggi-do (KR)

(72) Inventors: Hak Kyum Kim, Seoul (KR); Seung Gill Baek, Seoul (KR)

(73) Assignee: ATEC AP CO., LTD., Seongnam-si, Gyeonggi-Do (KR)

( * ) Notice: Subject to any disclaimer, the term of this patent is extended or adjusted under 35 U.S.C. 154(b) by 558 days.

(21) Appl. No.: 15/137,595

(22) Filed: Apr. 25, 2016

(65) Prior Publication Data

US 2016/0314446 A1    Oct. 27, 2016

(30) Foreign Application Priority Data

Apr. 23, 2015   (KR) .......................... 10-2015-0057142

(51) Int. Cl.
*G07F 19/00*     (2006.01)
*G06Q 20/10*     (2012.01)
(Continued)

(52) U.S. Cl.
CPC ......... *G06Q 20/1085* (2013.01); *G07D 11/16* (2019.01); *G07D 11/40* (2019.01); *G07F 19/202* (2013.01); *G07D 11/50* (2019.01)

(58) Field of Classification Search
CPC ........... G06Q 20/1085; G07D 11/0021; G07D 11/0081; G07D 11/0084; G07F 19/202
(Continued)

(56) References Cited

U.S. PATENT DOCUMENTS 6,170,822 B1   1/2001 Kato et al.
2002/0066636 A1   6/2002 Saltsov et al.
(Continued)

FOREIGN PATENT DOCUMENTS

CN   1214490 A   4/1999
CN   1421824 A   6/2003
(Continued)

OTHER PUBLICATIONS

Office Action dated Aug. 1, 2016 in Korean Application No. 1020150057142.
(Continued)

*Primary Examiner* — Toan C Ly
(74) *Attorney, Agent, or Firm* — Saliwanchik, Lloyd & Eisenschenk

(57) ABSTRACT

A financial device includes a medium depositing and withdrawing module having a medium receiving space to receive a medium, a discrimination module to discriminate the medium, a temporary stacking module to temporarily stack the medium, a medium storage unit to store at least one of media to be deposited and withdrawn, which are accepted into the medium receiving space, and a transfer module to guide a medium to the medium storage unit and a medium discharged from the medium storage unit. A portion of the transfer module can be changed or replaced to install or remove an additional function module which performs at least one function of a replenishment function to replenish a medium to the medium storage unit and a collection function to collect a medium from the medium storage unit.

54 Claims, 28 Drawing Sheets

(51) Int. Cl.
*G07D 11/16* (2019.01)
*G07D 11/40* (2019.01)
*G07D 11/50* (2019.01)

(58) Field of Classification Search
USPC .......................................................... 235/379
See application file for complete search history.

(56) References Cited

U.S. PATENT DOCUMENTS

| | | |
|---|---|---|
| 2002/0088850 A1 | 7/2002 | Katou et al. |
| 2003/0094402 A1 | 5/2003 | Seo et al. |
| 2009/0215374 A1 | 8/2009 | Wingerter |
| 2011/0221426 A1 | 9/2011 | Han |
| 2011/0240734 A1 | 10/2011 | Sudo et al. |
| 2012/0261874 A1* | 10/2012 | Arikata .............. G07D 11/0081 271/9.01 |
| 2012/0279173 A1 | 11/2012 | Sakoguchi et al. |
| 2013/0307210 A1 | 11/2013 | Takada |
| 2014/0284171 A1 | 9/2014 | Lee |
| 2016/0314446 A1 | 10/2016 | Kim et al. |

FOREIGN PATENT DOCUMENTS

| | | | |
|---|---|---|---|
| CN | 102239509 A | 11/2011 |
| CN | 102598067 A | 7/2012 |
| CN | 103247106 A | 8/2013 |
| CN | 103646461 A | 3/2014 |
| CN | 104346864 A | 2/2015 |
| EP | 2518697 A1 | 10/2012 |
| JP | 2000-020783 A | 1/2000 |
| JP | 2001-236542 A | 8/2001 |
| JP | 2007-213279 A | 8/2007 |
| JP | 2008-59472 A | 3/2008 |
| JP | 2008-197938 A | 8/2008 |
| KR | 20060130400 A | 12/2006 |
| KR | 10-2007-0047025 A | 5/2007 |
| KR | 10-2011-0101664 A | 9/2011 |
| KR | 10-2012-0079823 A | 7/2012 |
| KR | 10-2013-0027659 A | 3/2013 |
| KR | 20140087542 A | 7/2014 |
| KR | 20140088946 A | 7/2014 |
| RU | 2007137101 A | 5/2009 |
| WO | WO-0233668 A2 | 4/2002 |
| WO | WO-2013/022275 A2 | 2/2013 |
| WO | WO-2013061470 A1 | 5/2013 |

OTHER PUBLICATIONS

Office Action dated Mar. 27, 2018 in Japanese Application No. 2016-087319.
Decision to Grant dated Dec. 12, 2017 in Russian Application No. 2016115753/12(024750), along with its English Translation.
Office Action dated May 17, 2017 in Japanese Application No. 2016-087319.
Office Action dated Jul. 3, 2018 in Chinese Application No. 201610257572.7.
Office Action dated Jul. 17, 2017 in Russian Application No. 2016115753/12.
Notice of Allowance dated Jan. 25, 2017 in Korean Application No. 1020150057142.
European Search Report dated Sep. 29, 2016 in European Application No. 16166574.
Office Action dated Apr. 1, 2019 in Chinese Application No. 201610257572.7.

* cited by examiner

FINANCIAL DEVICE HAVING A REPLACEABLE MODULE FOR PERFORMING REPLENISHMENT OR COLLECTION FUNCTION

CROSS-REFERENCE TO RELATED APPLICATION

This application claims the benefit under 35 U.S.C. § 119 of Korean Patent Application No. 10-2015-0057142, filed Apr. 23, 2015, which is hereby incorporated by reference in its entirety.

BACKGROUND

Generally, financial devices are devices that process a financial transaction that is desired by a customer. The financial devices may deposit or withdrawal a medium or automatically transfer a medium.

The financial devices may be classified into, for example, financial devices for customers, which are used by customers and financial devices for tellers, which are used by tellers.

Also, the financial devices for customers may be classified into deposit/withdrawal-combined financial devices, financial devices for deposit, and financial devices for withdrawal according to use.

A medium processing apparatus and financial device are disclosed in Korean Patent Publication No. 2013-0027659 (Published Date: Mar. 18, 2013) (hereinafter, referred to as a "prior document 1").

A financial automatic device is disclosed in Korean Patent Publication No. 2012-0079823 (Published Date: Jul. 13, 2012) (hereinafter, referred to as a "prior document 2").

A financial device for a teller is disclosed in prior document 1, and a financial device for a customer is disclosed in prior document 2.

Since a module constituting a financial device varies in arrangement and structure according its use, a financial device has to be newly designed or manufactured based on its intended use.

Also, in the case of the financial devices for customers or financial devices for tellers, the financial devices may vary in size or specification according to areas to be used. According to the prior documents, modules may not commonly used, regardless of the kinds of financial devices or areas to be used and have to be newly manufactured or designed for each kind of financial devices.

SUMMARY

Embodiments provide a financial device which is transformable in various configurations according to use or positions to be installed.

In one embodiment, a financial device comprises: a medium depositing and withdrawing module having a medium receiving space to receive a medium; a discrimination module to discriminate the medium; a temporary stacking module to temporarily stack the medium; a medium storage unit to store at least one of media to be deposited and withdrawn, which are accepted into the medium receiving space; and a transfer module to guide a medium to the medium storage unit and a medium discharged from the medium storage unit, wherein a portion of the transfer module is changeable or replaceable to install or remove an additional function module which performs at least one function of a replenishment function to replenish a medium to the medium storage unit and a collection function to collect a medium from the medium storage unit.

The transfer module may comprise a common transfer module which is used regardless of a configuration of the financial device, when the additional function module is installed, an additional transfer module may be connected to the common transfer module, and when the additional function module is removed, the additional transfer module may be removed.

The financial device may further comprises a collection module to collect the medium and a transfer module to guide the medium to the collection module, wherein, when the additional function module is removed, the collection module and the transfer module to guide the medium to the collection module may be removed.

The additional transfer module may be connected to the transfer module to guide the medium to the collection module.

The additional function module may be disposed above the collection module.

The additional function module may be replaced with a plurality of collection modules to collect the medium, and the additional transfer module may be replaced with a transfer module having plural branch paths through which the medium is transferrable to each of the plurality of collection modules.

The transfer module may comprise a common transfer module which is used regardless of a configuration of the financial device, and when it is intended to install the collection module to collect the medium, a transfer module to connect the collection module to the common transfer module may be additionally provided.

The medium storage unit may comprise a plurality of medium storage modules to store media, the added collection module may be provided in plurality, the common transfer module may be connected to a portion of the plurality of medium storage modules, and the added transfer module may be connected to the other portion of the plurality of medium storage modules.

When the collection module is added, the additional function module may be disposed above the collection module.

A portion of the transfer module may be changed to change a position of the temporary stacking module.

The transfer module may comprise a common transfer module which is used regardless of a configuration of the financial device, and to change the position of the temporary stacking module, a transfer module connecting the common transfer module to the temporary stacking module may be additionally installed.

A collection module to collect a medium may be additionally installed under the temporary stacking module.

In another embodiment, a financial device comprises: a medium depositing and withdrawing module having a medium receiving space to receive a medium; a discrimination module to discriminate the medium; a first transfer module to guide the medium of the medium depositing and withdrawing module to the discrimination module; a temporary stacking module in which a medium to be withdrawn, which passes through the discrimination module, is temporarily stacked; a first connection module to transfer the medium between the discrimination module and the temporary stacking module; a medium storage unit to store a medium to be deposited and a medium to be withdrawn; and a second connection module to guide a medium passing through the first connection module to the medium storage unit, wherein the temporary stacking module is disposed above the first connection module, the first connection module is disposed above the second connection module, and the second connection module is disposed above the medium storage unit, the temporary stacking module, the first connection module, the second connection module, and the medium storage unit are disposed to vertically overlap with each other, and the medium depositing and withdrawing module, the discrimination module, the second connection module, and the medium storage unit are disposed to vertically overlap with each other.

In further another embodiment, a financial device comprises: a medium depositing and withdrawing module having a medium receiving space to receive a medium; a discrimination module to discriminate the medium; a first transfer module to guide the medium of the medium depositing and withdrawing module to the discrimination module; a second transfer module to transfer the medium passing through the discrimination module; a third transfer module to transfer the medium passing through the second transfer module; a fourth transfer module disposed under the discrimination module to transfer the medium passing through the third transfer module; a medium storage unit to store the medium transferred from the fourth transfer module, the medium storage unit to transfer the stored medium to the fourth transfer module; a temporary stacking module in which the medium to be withdrawn, which passes through the discrimination module is temporarily stacked; and a fifth transfer module to guide the medium passing through the third transfer module to the fourth transfer module and the temporary stacking module.

The details of one or more embodiments are set forth in the accompanying drawings and the description below. Other features will be apparent from the description and drawings, and from the claims.

DETAILED DESCRIPTION OF THE EMBODIMENTS

Figure 1:
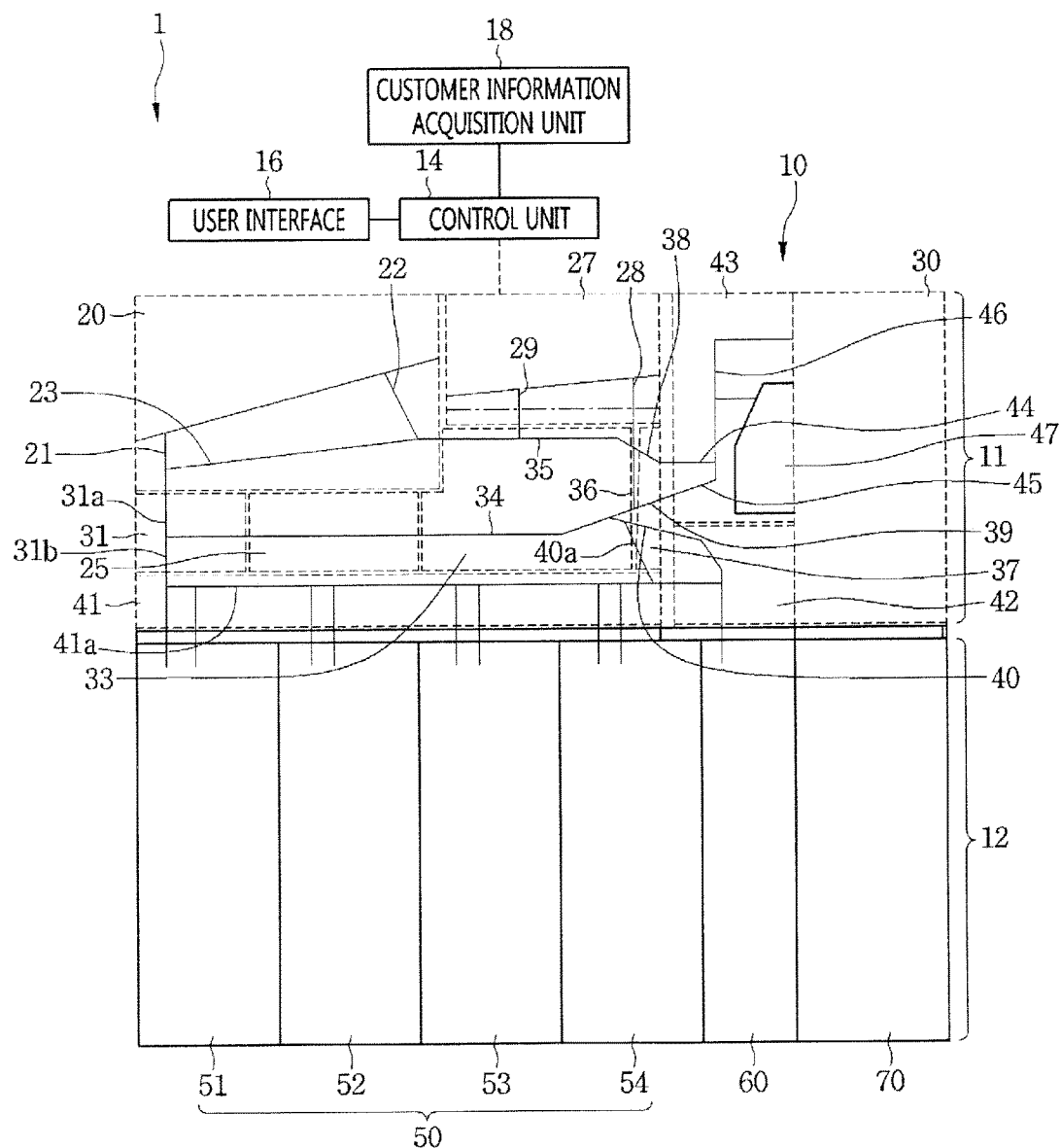
FIG. 1 is a schematic view of a financial device according to an embodiment.

Hereinafter, exemplary embodiments of the present disclosure will be described with reference to the accompanying drawings. Regarding the reference numerals assigned to the elements in the drawings, it should be noted that the same elements may be designated by the same reference numerals, wherever possible, even though they are shown in different drawings. Also, in the description of embodiments, detailed description of well-known related structures or functions may be omitted when it is deemed that such description may cause ambiguous interpretation of the present disclosure.

Also, in the description of embodiments, terms such as first, second, A, B, (a), (b) or the like may be used herein when describing components of the present disclosure. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial business, such as medium processing comprising processing such as deposit processing, giro receipt, or gift certificate exchange and/or processing such as withdrawal processing, giro dispensing, or gift certificate dispensing by receiving various media such as, e.g., paper money, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial business such as a financial information system (FIS).

Hereinafter, assuming that the financial device is an ATM, an embodiment will be described. However, this assumption is merely for convenience of description, and the present invention is not limited to the ATM.

In this specification, a financial device may be transformed into various configurations. Also, to use the financial device having the various configurations, the financial device may comprise a common module that is commonly provided regardless of the configuration of the financial device.

In this specification, the financial device may vary in configuration according to the number of modules or an arrangement of the modules and a size or use of the financial device depending on the arrangement of the modules.

The module described in this specification may be a component for performing at least one independent function and capable of being coupled to another module. Also, the module may be manufactured such that a plurality of modules may be coupled to each other.

The common modules as described above may have the same structure and arrangement, regardless of the configuration of the financial device.

Hereinafter, various configurations in which the financial device is transformed will be described.

FIG. 1 is a schematic view of a financial device according to an embodiment.

FIG. 1 illustrates a state in which the financial device is used in a first configuration.

Referring to FIG. 1, a financial device 1 according to an embodiment may comprise a medium processing apparatus 10 for processing a medium.

The financial device 1 may comprise a housing (not shown) for protecting the medium apparatus 10, regardless of a configuration thereof. The housing may vary in size and configuration according to its purpose of use, module constituents, functions of the financial device 1, etc.

A door that is openable to access the medium processing apparatus 10 may be connected to the housing. The door may be generally disposed at a rear side of the financial device 1 and opened by a teller or manager.

The financial device 1 may further comprise a customer information acquisition unit 18 for acquiring information of a customer. Alternatively, the customer information acquisition unit 18 may comprise a near field communication module.

The customer information acquisition unit 18 may comprise a bankbook processing module through which a bankbook is insertable and withdrawable and for recognizing the bankbook. Alternatively, the customer information acquisition unit 18 may comprise a card processing module through which a card is insertable and withdrawable and for recognizing the card.

The current embodiment is not limited to a kind of customer information acquisition unit 18. For example, the customer information acquisition unit 18 may acquire information recorded in an RFID tag or USB or may acquire customer's information by using bio-information such as customer's fingerprint.

The financial device 1 may further comprise a user interface 16 which displays a menu and information for depositing or withdrawing a medium or for inputting or selecting a command or information for depositing or withdrawing the medium.

The financial device 1 may further comprise a control unit 14, such as a microprocessor or electronic control circuitry, for controlling the medium processing apparatus and the user interface 16. Here, the control unit 14 may comprise a medium processing apparatus control part for controlling the medium processing apparatus 10 and a financial device control part for controlling the financial device 1.

The medium processing apparatus 10 may comprise an upper module 11 and a lower module 12. The upper module 11 may be separably connected to the lower module 12 or movably connected to the lower module 12. Alternatively, the upper module 11 and the lower module 12 may not be connected to each other, but maintained in contact with each other.

The medium processing apparatus 10 may comprise a medium depositing and withdrawing module 20 for depositing and withdrawing a medium.

The medium depositing and withdrawing module 20 may have a medium receiving space that is accessible by a customer. The medium receiving space may be opened or closed by a covering member such as a shutter and/or cover. In some cases, the receiving space may be maintained in an opened state. The medium receiving space may be partitioned into a plurality of receiving spaces by a partition member.

The medium depositing and withdrawing module 20 may serve as a common entrance part through which various kinds of media such as bills and checks are accepted or withdrawn. The media may be accepted into the medium depositing and withdrawing module 20 in a bundle. Alternatively, the media may be withdrawn from the medium depositing and withdrawing module 20 in a bundle. Here, the bills and checks may be deposited and withdrawn together in the medium depositing and withdrawing module 20 in a bundle.

Alternatively, a depositing space into which the medium is deposited and a withdrawal space from which the medium is withdrawn are divided within the medium depositing and withdrawing module 20. Alternatively, the medium depositing and withdrawing module 20 may comprise a medium depositing module and a medium withdrawal module which are independent from each other.

The medium depositing and withdrawing module 20 may have a first path 21 through which the medium in the medium receiving space is transferred and a second path 22 through which a medium to be received into the medium receiving space is transferred.

The medium depositing and withdrawing module 20 may further have a third path 23 that is distinguished from the first path 21 and the second path 22.

In this specification, formation of a path for a specific module may comprise formation of a path for the specific module alone as well as formation of a path of the specific module together with another module.

The medium processing apparatus 10 may further comprise a discrimination module 25. The discrimination module 25 may determine a state of the medium. For example, discrimination module 25 may identify a kind, thickness, and sum of medium during a deposit transaction process and a withdrawal transaction process or determine an abnormal medium or a forged medium.

The medium processing apparatus 10 may further comprise a first transfer module 31 for transferring media stacked in the medium depositing and withdrawing module 20 to the discrimination module 25.

The first transfer module 31 may receive a medium in the first 21 of the medium depositing and withdrawing module

20 to transfer the received medium to the discrimination module 25. The first transfer module 31 may comprise a main path 31*a*. The main path 31*a* may connect the medium depositing and withdrawing module 20 to the discrimination module 25. The first transfer module 31 may further comprise a branch path 31*b* connected to the main path 31*a*. The branch path 31*b* may be connected to a fourth transfer module 41.

The first transfer module 31 and the discrimination module 25 may be disposed under the medium depositing and withdrawing module 20.

At least a portion of the first transfer module 31 may be disposed to vertically overlap with the medium depositing and withdrawing module 20. Also, at least a portion of the discrimination module 25 may be disposed to vertically overlap with the medium depositing and withdrawing module 20.

The medium processing apparatus 10 may further comprise a second transfer module 33 for transferring the medium passing through the discrimination module 25. The second transfer module 33 may be disposed at a side opposite to the first transfer module 31 with respect to the discrimination module 25.

The second transfer module 33 may define a fourth path 34 and a fifth path 35 which are separate paths. The medium passing through the discrimination module 25 may be transferred along the fourth path 34.

The medium transferred into the medium depositing and withdrawing module 20 may be transferred along the fifth path 35. The medium transferred along the fifth path 35 may be transferred into the second path 22 or the third path 23.

Although not limited thereto, the fourth path 34 and the fifth path 35 may be vertically arranged with each other.

The medium processing apparatus 10 may further comprise a temporary stacking module 27 for temporarily stacking media.

The temporary stacking module 27 may temporarily stack media received through the medium depositing and withdrawing module 20 while the deposit transaction process.

The media stacked in the temporary stacking module 27 may be transferred to a medium storage unit 50 that will be described below or return to the medium depositing and withdrawing module 20 while the deposit transaction process The temporary stacking module 27 may be disposed at a rear side of the medium depositing and withdrawing module 20. At least a portion of the temporary stacking module 27 may be disposed to horizontally overlap with the medium depositing and withdrawing module 20. To realize compactness of the financial device 1 and simplification of the path, the whole temporary stacking module 27 may be disposed to horizontally overlap with the medium depositing and withdrawing module 20. In this specification, the "front direction" may be a direction that is directed to a front surface of the financial device, and the "rear direction" may be a direction that is directed to a rear surface of the financial device. In this specification, the front surface of the financial device may be a left surface in FIG. 1.

Also, in a state where other modules or paths are not disposed between the medium depositing and withdrawing module 20 and the temporary stacking module 27, the temporary stacking module 27 may be disposed at a rear side of the medium depositing and withdrawing module 20. Thus, the medium in the medium depositing and withdrawing module 20 may be transferred to the temporary stacking module 27 in which the medium does not pass between the temporary stacking module 27 and the medium depositing and withdrawing module 20. Also, the medium withdrawn from the temporary stacking module 27 may be transferred to the second path 22 or the third path 23 in which the medium does not pass between the temporary stacking module 27 and the medium depositing and withdrawing module 20.

At least a portion of the temporary stacking module 27 may be disposed to vertically overlap with the second transfer module 33.

The temporary stacking module 27 may define an introduction path 28 and a withdrawal path 29. The withdrawal path 29 may be connected to the fifth path of the second transfer module 33.

In the temporary stacking module 27, the medium may be stacked to stand up so that a long side having a relatively long length of the medium is supported by a stacking surface. Also, the medium may be transferred upward along the introduction path 28 and be transferred downward along the withdrawal path 29.

The second transfer module 33 may further define a portion or the whole of a guide path 36 for guiding the medium in the fourth path 34 to the fifth path 35.

The guide path 36 may be connected to the introduction path 28 of the temporary stacking module 27. In another example, the introduction path 28 may be connected to the fifth path 35.

The medium processing apparatus 10 may further comprise a third transfer module 37 defining a portion or the whole of the guide path 36 together with the second transfer module 33.

In another example, the third transfer module 37 may solely define the guide path 36. Alternatively, the second transfer module 33 may solely define the guide path 36.

The third transfer module 37 may be disposed at a rear side of the second transfer module 33. Also, at least a portion of the third transfer module 37 may be disposed to vertically overlap with the temporary stacking module 27.

The third transfer module 37 may define a plurality of connection paths 38 to 40 which are vertically arranged.

Although not limited thereto, the plurality of connection paths 38 to 40 may comprise portions or the whole of a first connection path 38, a second connection path 39 disposed under the first connection path 38, a third connection path 40 disposed under the second connection path 39, and a fourth connection path 40*a* disposed under the third connection path 40.

The medium processing apparatus 10 may further comprise a medium storage unit 50 for storing a medium. The medium storage unit 50 may comprise a plurality of medium storage modules 51 to 54.

The plurality of medium storage modules 51 to 54 may comprise at least one bill storage module and at least one check storage module. This specification is not limited to the number of bill storage modules and the number of check storage modules. As another example, the medium storage unit 50 may comprise only the bill storage module for storing bills or only the check storage module for storing checks. Alternatively, the plurality of medium storage modules 51 to 54 may comprise storage modules for storing gift certificates, securities, tickets, and the like. Alternatively, the check storage module may be replaced with a storage module for storing gift certificates, securities, tickets, and the like. Here, the medium storage module may be embodied in a cassette, a box, a bin, and the like.

In this specification, a process in which the media accepted into the medium depositing and withdrawing module 20 are stacked in the temporary stacking module 27 may be called a first deposit process, and a process in which the media temporarily stacked in the temporary stacking module 27 are transferred to and stacked in the medium storage unit 50 may be called a second deposit process.

The medium processing apparatus 10 may further comprise a fourth transfer module 41 for transferring a medium transferred from the third transfer module 37 to the medium storage unit 50.

The fourth transfer module 41 may further comprise a sixth path 41a. The fourth transfer module 41 may be disposed under the first transfer module 31, the discrimination module 25, the second transfer module 33, and the third transfer module 37.

Each of the first transfer module 31, the discrimination module 25, the second transfer module 33, and the third transfer module 37 may be disposed to vertically overlap with at least a portion of the fourth transfer module 41.

Also, the temporary stacking module 27, the second transfer module 33, the fourth transfer module 41, and the medium storage unit 50 may be disposed to vertically overlap with each other.

Also, the medium depositing and withdrawing module 20, the discrimination module 25, the fourth transfer module 41, and the medium storage unit 50 may be disposed to vertically with overlap each other.

The branch path 31b of the first transfer module 31 may be connected to the sixth path 41a of the fourth transfer module 41.

The medium processing apparatus 10 may further comprise a fifth transfer module 42. The fifth transfer module 42 may connect the third transfer module 37 to the fourth transfer module 41. That is, the fifth transfer module 42 may transfer a medium transferred from one module of the third and fourth transfer modules 37 and 41 to the other module.

The medium processing apparatus 10 may further comprise a sixth transfer module 43. The sixth transfer module 43 may transfer a medium to the third transfer module 37 or receive a medium from the third transfer module 37. Although not limited, the sixth transfer module 43 may transfer a medium in two directions.

The sixth transfer module 43 may comprise a first branch path 44 connected to the first connection path 38 of the third transfer module 37, a second branch path 45 connected to the second connection path 39 of the third transfer module 37, and a common path 46 connected to the first branch path 44 and the second branch path 45.

The sixth transfer module 43 may further comprise a collection part 47 for collecting a medium. Although not shown, the collection part 47 may store at least one of a medium that is not yet taken by the customer even though the medium is released to the customer through the depositing and withdrawing module 20, a medium that is determined as an abnormal medium in the discrimination module 25, and a medium that is not recognized. Alternatively, the collection part 47 may be separately provided with respect to the sixth transfer module 43 and connected to the sixth transfer module 43.

The fifth transfer module 42 may be disposed at a rear side of the fourth transfer module 41, and the sixth transfer module 43 may be disposed at rear sides of the third transfer module 41 and the temporary stacking module 27.

The sixth transfer module 43 may be disposed above the fifth transfer module 42. At least a portion of the sixth transfer module 43 may be disposed to vertically overlap with the fifth transfer module 42.

The medium processing apparatus 10 may further comprise an additional function module 30 for performing an additional function including replenishment or collection function for replenishing or collecting a medium or an audit function for precisely checking the number of media stored in the medium storing unit 50. The additional function module 30 may store at least one of a medium to be replenished in the medium storage unit 50 and a medium collected from the medium storage unit 50.

The additional function module 30 may be disposed at rear sides of the fifth and sixth transfer modules 42 and 43. The additional function module 30 may receive a medium from the fifth transfer module 42 or transfer a medium the fifth transfer module 42.

The medium processing apparatus 10 may further comprise a seventh transfer module 60. The seventh transfer module 60 may be one component of the lower module 12 and be separably coupled to a lower frame. In detail, the seventh transfer module 60 may be realized in the form of the cassette that is not fixed to the lower module 12 through a coupling unit, but is detachably coupled to the lower module 12.

The seventh transfer module 60 may receive a medium from the fifth transfer module 42 or transfer a medium to the fifth transfer module 42.

The seventh transfer module 60 may be horizontally disposed with respect to the plurality of medium storage modules 51 to 54 (disposed in a row with the plurality of medium storage modules 51 to 54).

The medium processing apparatus 10 may further comprise a collection module 70. The collection module 70 may collect a rejected occurring in at least one process of a medium deposit transaction process, a medium withdrawal transaction process, a medium replenishment process, and a medium collection process and a medium that is determined as a medium, which is unsuitable to be stored in the medium storage unit. Also, the medium processing apparatus 10 may further comprise a deposited check collection space into which the deposited check transferred from the medium depositing and withdrawing module 20 is collected when the financial device 1 has a check deposit/withdrawal function. Here, the deposited checks may be divided into checks issued by own bank and checks issued by another bank and then collected. The deposited check collection space may be provided as a module separated from the collection module 70. Also, the deposited check collection space may be separated from the spaces partitioned within the collection module 70 and then integrated. The collection module 70 and/or the check collection space may be disposed at the most rear side of the financial device 1 so that the teller or manager who opens a door can easily access the collection module 70 and/or the check collection space.

The collection module 70 may constitute the lower module and is horizontally disposed with respect to the plurality of medium storage modules 51 to 54 and the seventh transfer module 60.

Also, the collection module 70 may be disposed under the additional function module 30 to vertically overlap with at least a portion of the additional function module 30.

Thus, according to the current embodiment, the upper module 11 may comprise the medium depositing and withdrawing module 20, the first transfer module 31, the discrimination module 25, the second transfer module 33, the temporary stacking module 27, the third transfer module 37, the fourth transfer module 41, the fifth transfer module 42, the sixth transfer module 43, and the additional function module 30.

The lower module 12 may comprise the medium storage unit 50, the seventh transfer module 60, and the collection module 70. However, the fourth transfer module 41 may not be provided in the upper module 11, but provided in the lower module 12.

Hereinafter, an operation of the financial device having a first configuration will be described.

Figure 2:
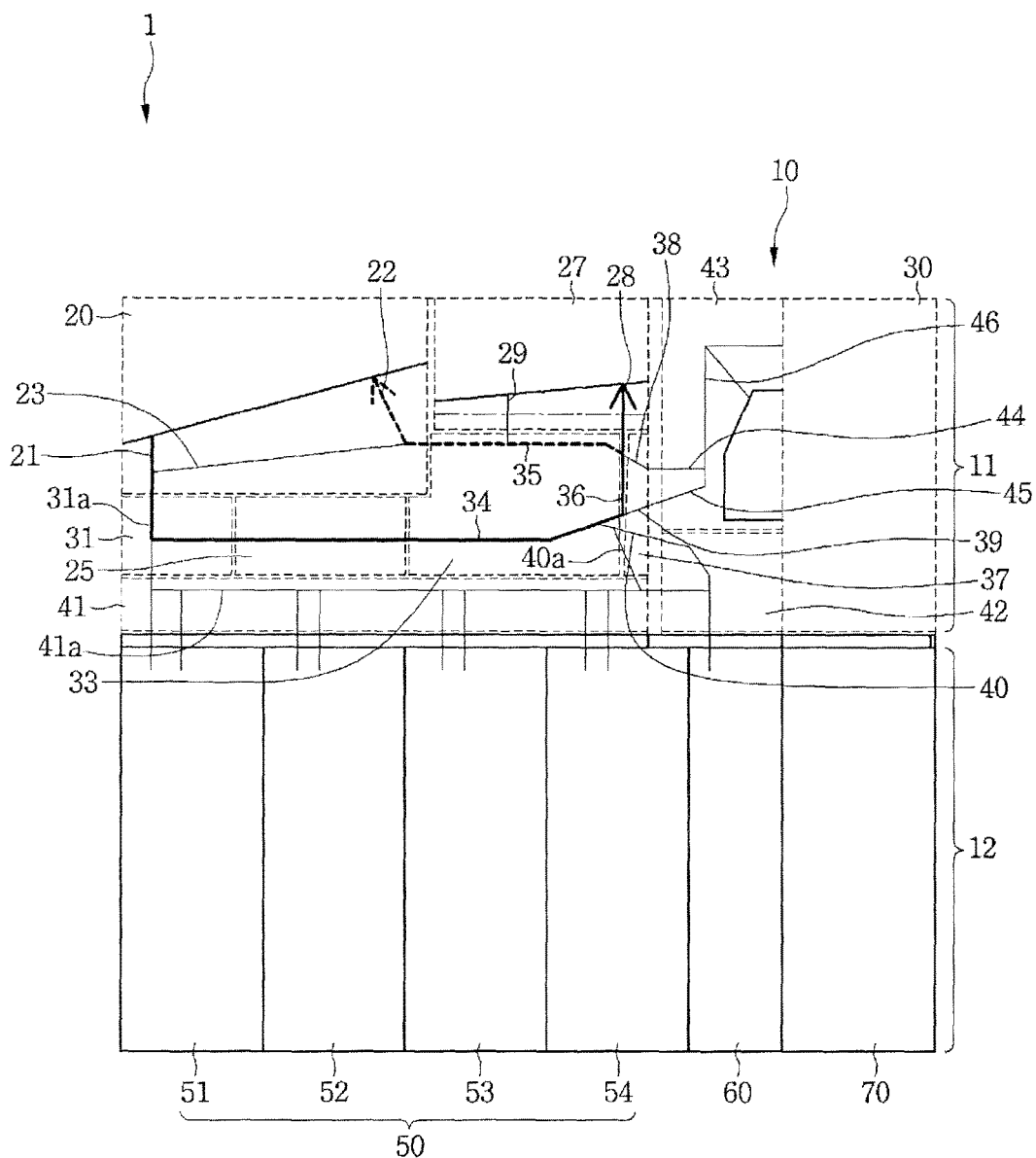
FIG. 2 is a schematic view illustrating a first deposit process of the financial device of FIG. 1.
Figure 3:
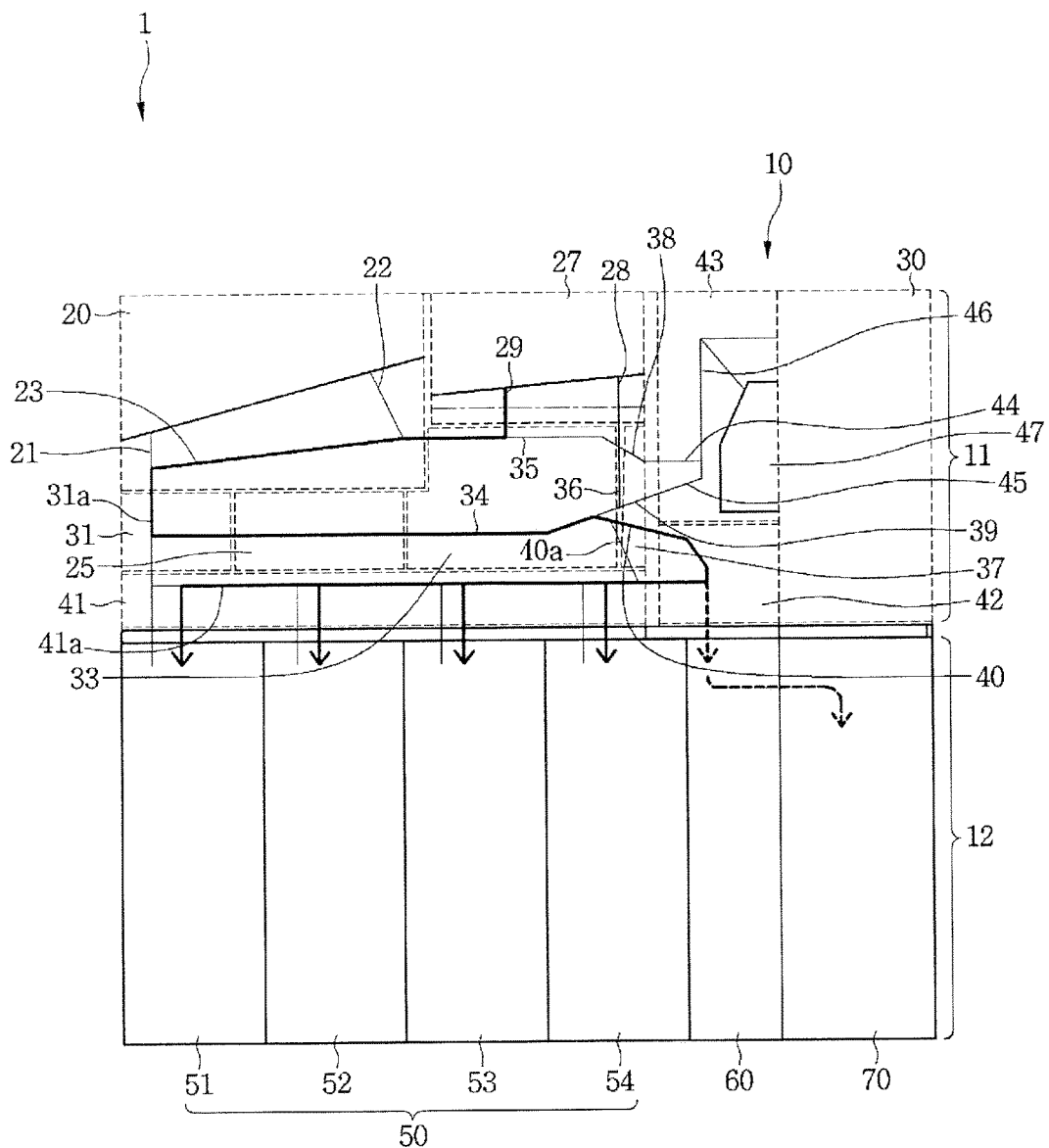
FIG. 3 is a schematic view illustrating a second deposit process of the financial device of FIG. 1.

FIG. 2 is a schematic view illustrating a first deposit process of the financial device of FIG. 1, and FIG. 3 is a schematic view illustrating a second deposit process of the financial device of FIG. 1.

Referring to FIGS. 1 to 3, to perform the deposit transaction of a medium, the medium may be accepted into the medium depositing space of the medium depositing and withdrawing module 20.

The media accepted into the medium depositing space may be separated by a sheet of media by a medium separation device. The media separated by a sheet of media may be transferred to the first transfer module 31 via the first path 21. The first transfer module 31 may transfer the medium to the discrimination module 25.

The discrimination module 25 may determine a kind of medium, whether the medium is normal, and the like.

The medium that is determined to be normal by the discrimination module 25 may be transferred to the temporary stacking module 27 by the second transfer module 33 and the third transfer module 37. For example, the medium that is determined as normal by the discrimination module 25 may be stacked in the temporary stacking module 27 via the fourth path 34, the guide path 36, and the introduction path 28.

On the other hand, the medium that is determined as abnormal by the discrimination module 25 or the medium that is not recognized by the discrimination module 25 may be transferred to the medium depositing and withdrawing module 20 by the second transfer module 33 and the third transfer module 37. For example, the medium that is determined as abnormal or is not recognized may be returned to the medium depositing and withdrawing module 20 via the fourth path 34, the guide path 36, the fifth path 35, and the second path 22.

When the first deposit process is completed, information (for example, at least one of the sum, kind, and number of media) of the medium that is accepted and stacked in the temporary stacking module 27 may be displayed on the user interface 16.

Also, a deposit confirmation command or deposit cancel command with respect to the medium stacked in the temporary stacking module 27 may be inputted through the user interface 16.

If the deposit confirmation command is inputted through the user interface 16, the medium stacked in the temporary stacking module 27 may be separated by the medium separation device (not shown). The medium separated by the medium separation device may be transferred to the fifth path 35 via the withdrawal path 29. The medium transferred to the fifth path 35 may be transferred to the third path 23 defined by the medium depositing and withdrawing module 20. The medium transferred to the third path 23 may pass again through the discrimination module 25 via the first transfer module 31.

The medium passing again through the discrimination module 25 may be transferred to the fifth transfer module 42 via the second transfer module 33 and the third transfer module 37.

The medium that is determined as normal among the media passing again through the discrimination module 25 may be transferred to the fourth transfer module 41 by the fifth transfer module 42. Also, the medium transferred to the fourth transfer module 41 may be finally accepted into the medium storage unit 50.

On the other hand, the medium that is determined as abnormal or the medium that is not recognized by the discrimination module 25 among the media passing again through the discrimination module 25 may be transferred to the seventh transfer module 60 by the fifth transfer module 42. The medium transferred to the seventh transfer module 60 may be finally collected to the collection module 70. The abnormal medium and the medium that is not recognized by the discrimination module may be called as a medium which is unsuitable to be stored in the medium storage unit 50.

When the deposit cancel command is inputted through the user interface 16, the media stacked in the temporary stacking module 27 may be separated from each other by the medium separation device (not shown). The medium separated by the medium separation device may be transferred to the fifth path 35 via the withdrawal path 29. The medium transferred to the fifth path 35 may return to the medium depositing and withdrawing module 20 via the second path 22 defined by the medium depositing and withdrawing module 20.

According to the current embodiment, since the temporary stacking module is disposed at the rear side of the medium depositing and withdrawing module, the transfer path through which the medium has to be transferred to the medium depositing and withdrawing module to allow the media stacked in the temporary stacking module to return and the transfer path through which the medium has to be transferred to the discrimination module to perform the second deposit process may be reduced in length.

Figure 4:
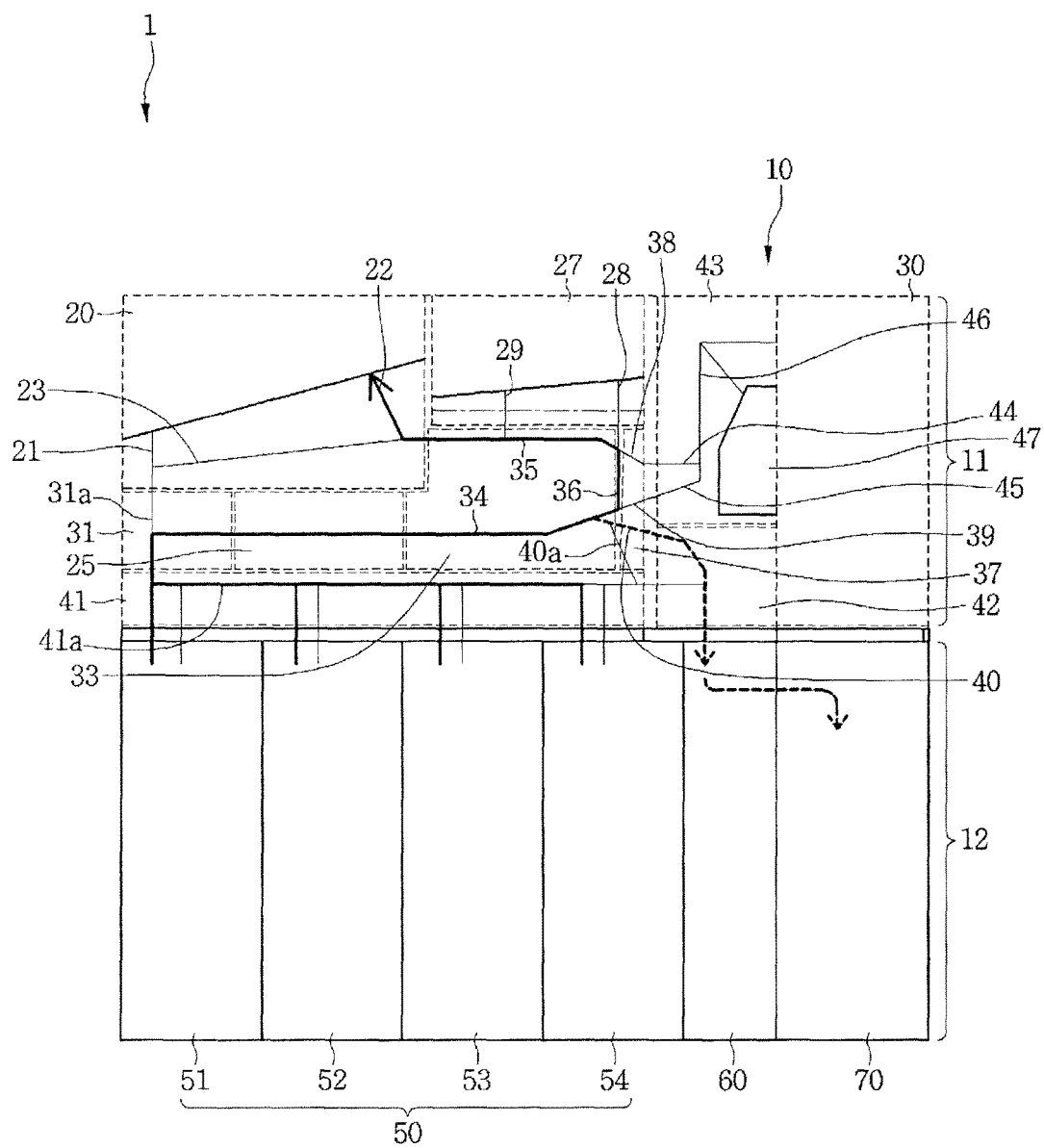
FIG. 4 is a schematic view illustrating a withdrawal process of the financial device of FIG. 1.

FIG. 4 is a schematic view illustrating a withdrawal process of the financial device of FIG. 1.

Referring to FIGS. 1 and 4, when the medium withdrawal command is inputted through the user interface 16, a kind and the number of medium corresponding to the sum of the medium to be withdrawn may be discharged from the medium storage unit 50. The medium discharged from the medium storage unit 50 may be transferred along the fourth transfer module 41 to pass through the discrimination module 25 via the first transfer module 31.

The medium determined as normal among the media passing through the discrimination module 25 may be transferred into the medium depositing and withdrawing module 20 by the second and third transfer modules 33 and 37.

On the other hand, the medium that is determined as abnormal or the medium that is not recognized by the discrimination module 25 among the media passing through the discrimination module 25 may be collected into the collection module 70 via the second, third, fourth, and seventh modules 33, 37, 42, and 60.

Figure 5:
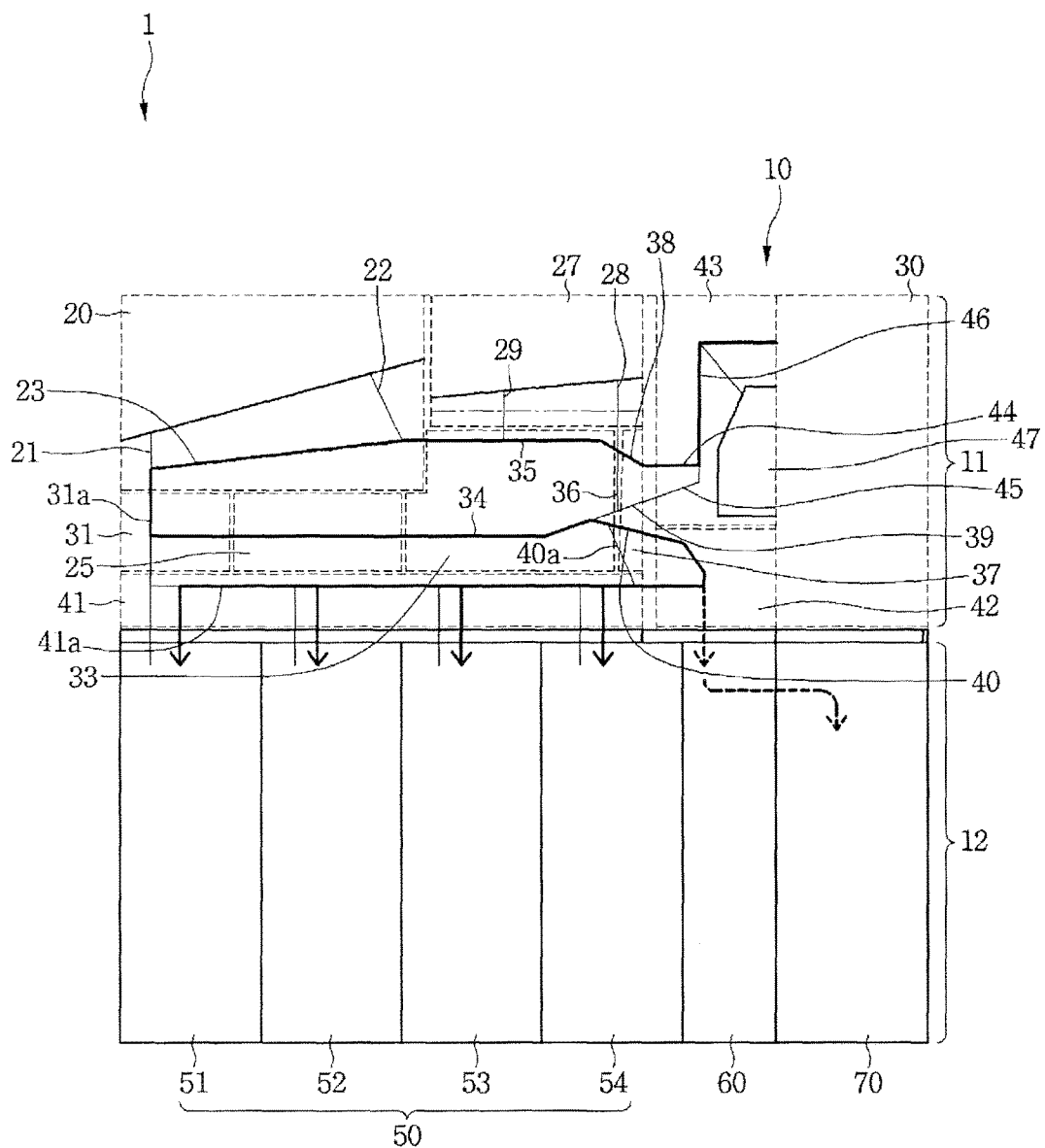
FIG. 5 is a schematic view illustrating a process of replenishing a medium in the financial device of FIG. 1.

FIG. 5 is a schematic view illustrating a process of replenishing a medium in the financial device of FIG. 1.

Referring to FIGS. 1 and 5, when the medium replenishment command is inputted through a teller interface (not shown) or the user interface 16 receives the medium replenishment command, the medium stacked in the additional function module 30 is discharged from the additional function module 30.

The medium discharged from the additional function module 30 may be transferred to the second transfer module 33 via the sixth transfer module 43 and the third transfer module 37. The medium to be replenished, which is transferred to the second transfer module 33 may pass through the third path 33 defined by the medium depositing and withdrawing module 20. The medium to be replenished, which passes through the third path 33 may pass through the discrimination module 25 by the first transfer module 31.

The medium to be replenished, which passes through the discrimination module 25 may be transferred to the fifth transfer module 42 via the second and third transfer modules 33 and 37.

The medium that is determined as normal among the media to be replenished, which passes through the discrimination module 25 may be transferred to the fourth transfer module 41 by the fifth transfer module 42. Also, the medium transferred to the fourth transfer module 41 may be finally replenished to the medium storage unit 50.

On the other hand, the medium that is determined as abnormal or the medium that is not recognized by the discrimination module 25 among the media to be replenished, which passes again through the discrimination module 25 may be transferred to the seventh transfer module 60 by the fifth transfer module 42. The medium transferred to the seventh transfer module 60 may be finally collected to the collection module 70.

Figure 6:
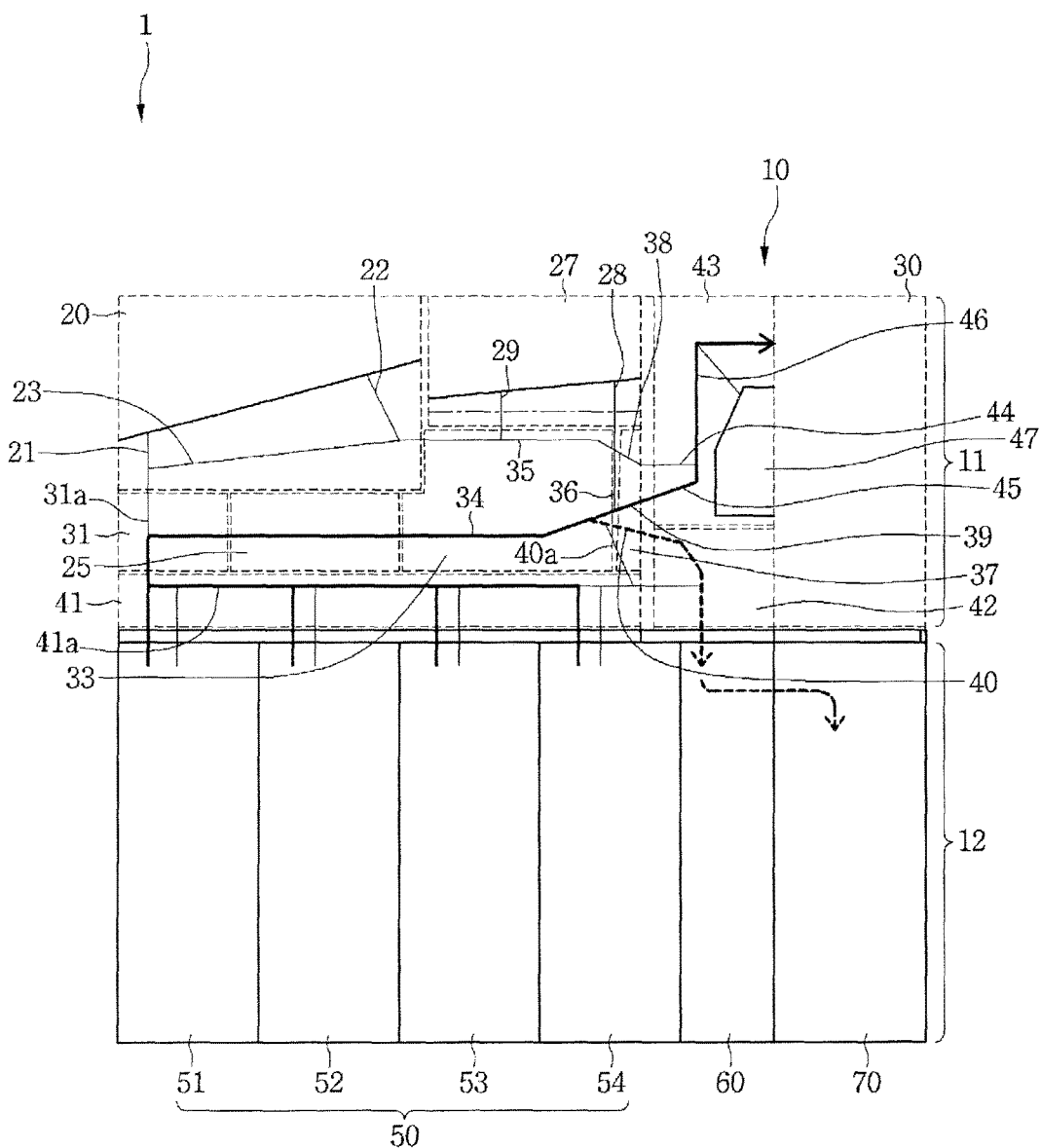
FIG. 6 is a schematic view illustrating a process of collecting a medium in the financial device of FIG. 1.

FIG. 6 is a schematic view illustrating a process of collecting a medium in the financial device of FIG. 1.

Referring to FIGS. 1 and 6, when the medium collection command is inputted through the teller interface (not shown) or the user interface 16 receives the medium collection command, the media stacked in at least one medium storage module of the plurality of medium storage modules 51 to 54 may be discharged and then transferred to the fourth transfer module 41. The medium to be collected, which is transferred to the fourth transfer module 41 may pass through the discrimination module 25 via the first transfer module 31.

The medium that is determined as normal among the media to be collected, which passes through the discrimination module 25 may be transferred to the sixth transfer module 43 by the second and third transfer modules 33 and 37, and then be finally collected to the additional function module 30.

On the other hand, the medium that is determined as abnormal or the medium that is not recognized by the discrimination module 25 among the media to be collected, which passes again through the discrimination module 25 may be transferred to the seventh transfer module 60 by the third and fifth transfer modules 37 and 42. The medium transferred to the seventh transfer module 60 may be finally collected to the collection module 70.

Figure 7:
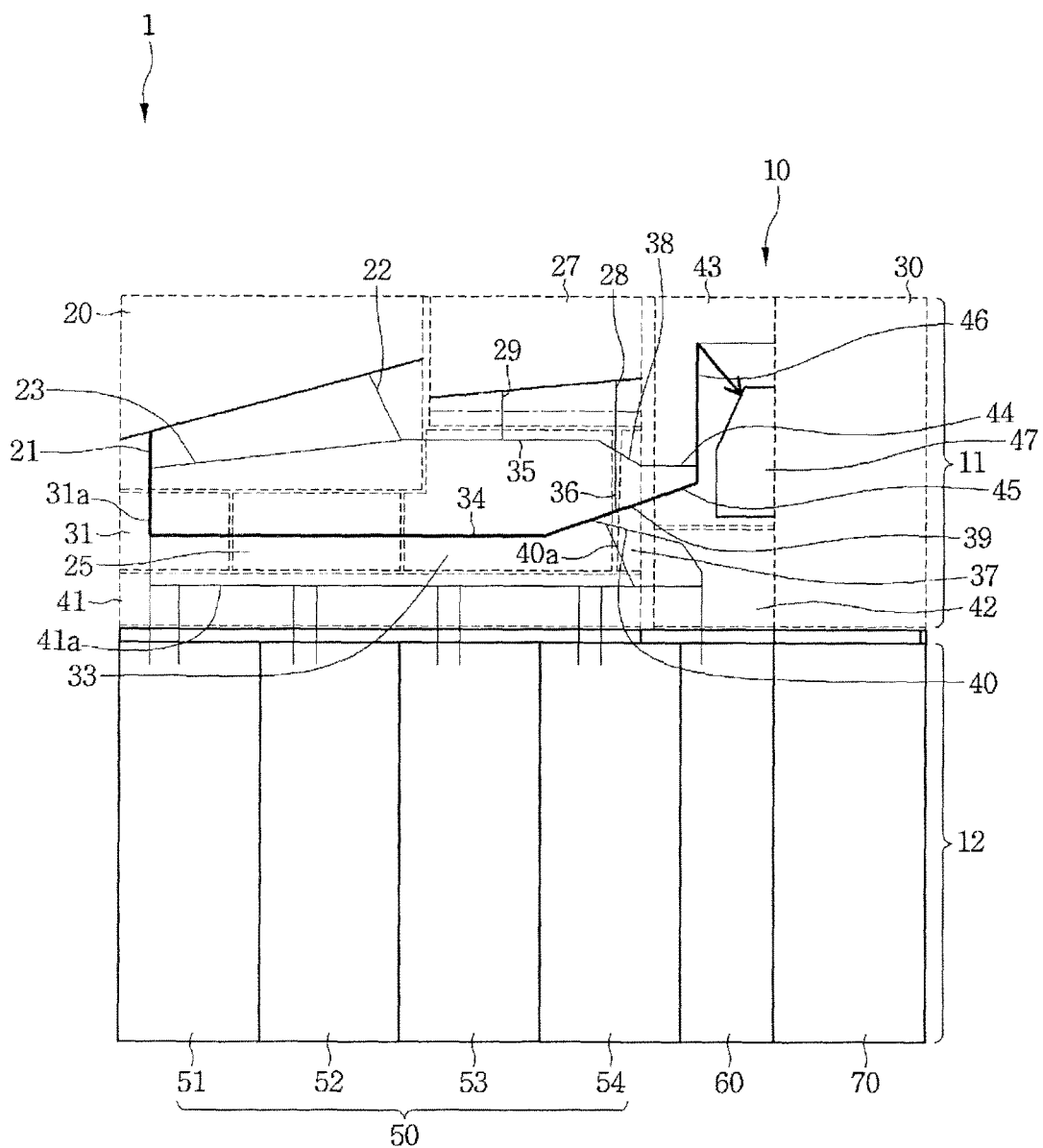
FIG. 7 is a schematic view illustrating a process of collecting an untaken medium in the financial device of FIG. 1.

FIG. 7 is a schematic view illustrating a process of collecting an untaken medium in the financial device of FIG. 1.

Referring to FIG. 7, when the customer does not take the medium discharged from the medium depositing and withdrawing module 20, the untaken medium may pass through the first path 21 and then be transferred to the discrimination module 25 by the first transfer module 31. The untaken medium that passes through the discrimination module 25 may be transferred to the sixth transfer module 43 by the second and third transfer modules 33 and 37 and then be finally collected to the collection part 47 provided in the sixth transfer module 43.

According to the financial device having the first configuration, the additional function module for replenishing and/or collecting a medium may be disposed at the most rear side of the financial device. Also, the additional function module may be disposed in an upper portion of the financial device. Thus, the teller or manager who opens the door may easily access the additional function module.

Figure 8:
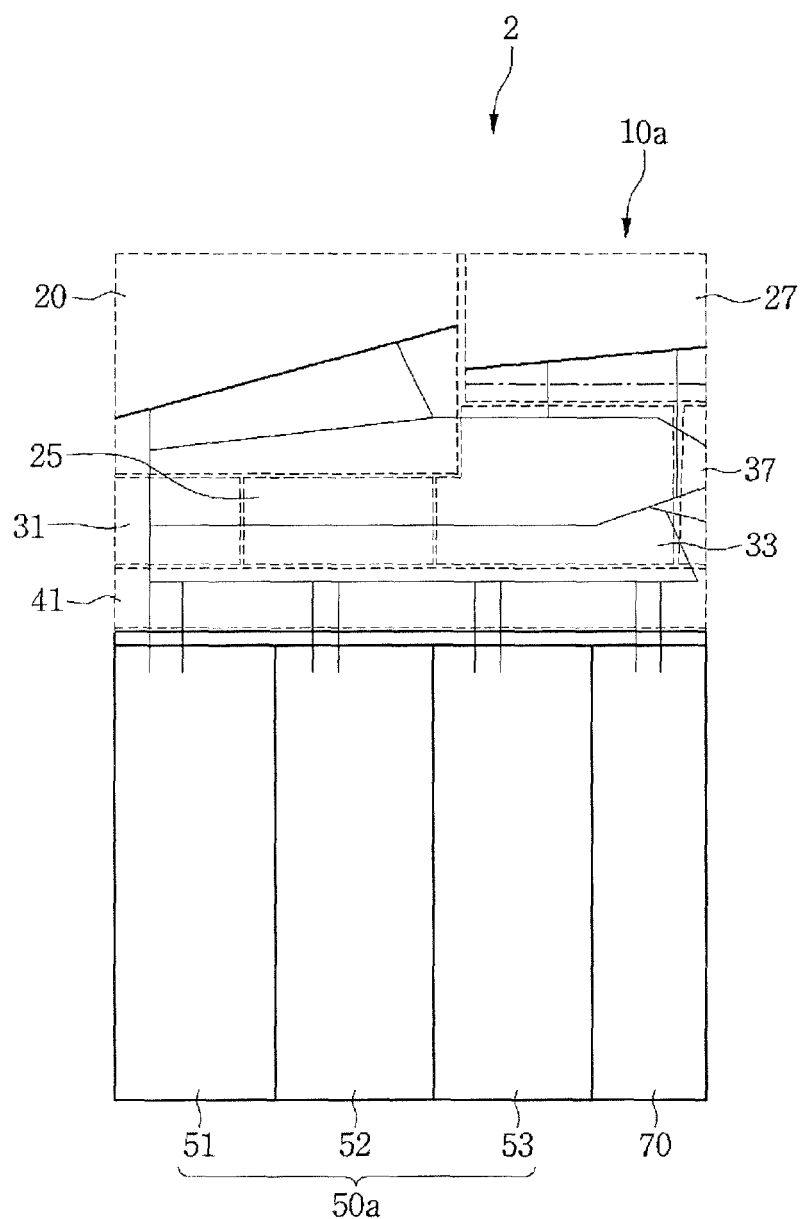
FIG. 8 is a schematic view of the financial device of FIG. 1 which has been transformed into a second configuration.

FIG. 8 is a schematic view of a state in which the financial device of FIG. 1 has been transformed to a second configuration.

Referring to FIG. 8, a financial device 2 having a second configuration comprises a medium processing apparatus 10a having a second configuration.

The medium processing apparatus 10a having the second configuration may commonly comprise at least the medium depositing and withdrawing module 20, the first transfer module 31, the discrimination module 25, the second transfer module 33, the third transfer module 37, the fourth transfer module 41, and the temporary stacking module 27 among the modules constituting the medium processing apparatus 10 having the first configuration.

The medium processing apparatus 10a may further comprise a medium storage unit 50a and a collection module 70.

Here, the collection module 70 may be equal to or different from the collection module 70 of FIG. 1. If the collection module 70 of FIG. 8 is the same as the collection module 70 of FIG. 1, the collection module 70 may comprise a box defining an outer appearance thereof. A medium opening through which a medium passes may be defined in each of side surfaces and a top surface of the box.

On the other hand, if the collection module 70 of FIG. 8 is different from the collection module 70 of FIG. 1, a medium opening of the collection module 70 of FIG. 8 may be defined in an upper portion of the box, and a medium opening of the collection module 70 of FIG. 1 may be defined in a side surface of the box.

The medium storage unit 50a may comprise a plurality of medium storage modules 51 to 53.

The financial device having the second configuration of FIG. 8 may have a configuration that is formed by removing modules, reducing a size of a module and/or removing a portion of the modules of the financial device having the first configuration of FIG. 1. Here, the financial device having the second configuration may have a configuration that is formed by removing modules and/or removing a portion of the modules of the financial device having the first configuration to miniaturize the financial device having the first configuration.

Thus, the number of medium storage modules 51 to 54 constituting the medium storage unit 50 of FIG. 1 may be more than that of medium storage modules 51 to 53 constituting the medium storage unit 50a of FIG. 8.

In the case of the medium processing apparatus 10a having the second configuration, the third transfer module 37 may directly transfer a medium to the fourth transfer module 41.

In summary, the financial device having the second configuration may have a configuration in which the fifth transfer module to the seventh transfer module and the additional function module are removed from the financial device having the first configuration.

Thus, in this specification, the medium depositing and withdrawing module 20, the first transfer module 31, the discrimination module 25, the second transfer module 33, the third transfer module 37, the fourth transfer module 41, and the temporary stacking module 27, and at least one medium storage module may be common modules constituting the financial device for the customer, regardless of the configuration thereof.

Figure 9:
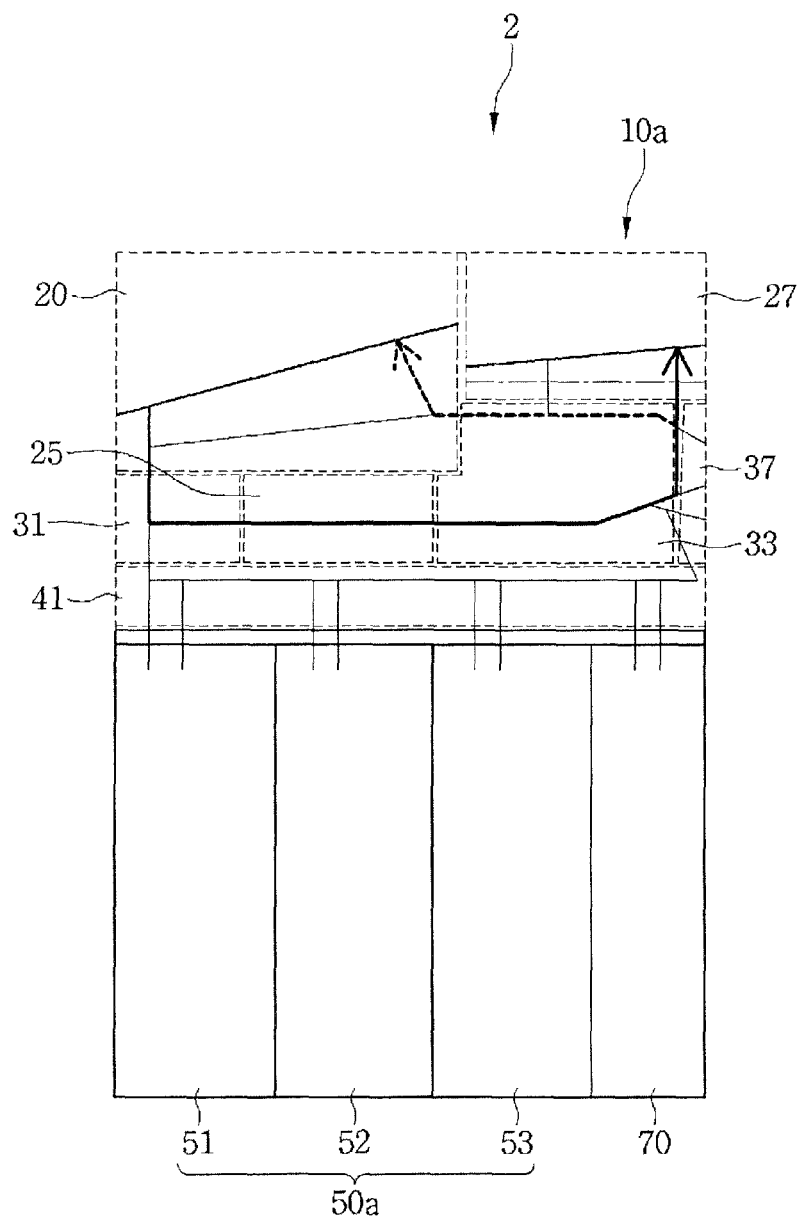
FIG. 9 is a schematic view illustrating a first deposit process of the financial device of FIG. 8.
Figure 10:
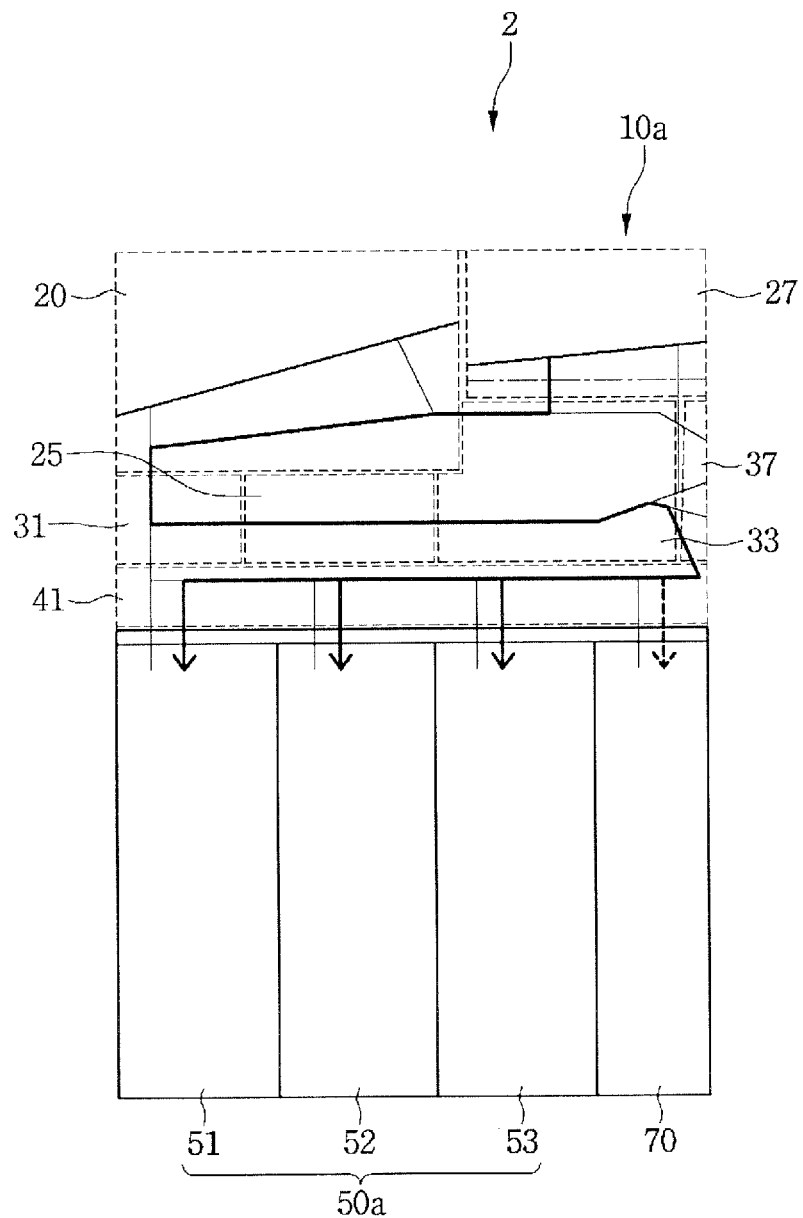
FIG. 10 is a schematic view illustrating a second deposit process of the financial device of FIG. 8.

FIG. 9 is a schematic view illustrating a first deposit process of the financial device of FIG. 8, and FIG. 10 is a schematic view illustrating a second deposit process of the financial device of FIG. 8.

Referring to FIGS. 9 and 10, to perform deposit transaction of a medium, media may be accepted into a medium depositing space of the medium depositing and withdrawing module 20.

The media accepted into the medium depositing space may be separated by a sheet of media by a medium separation device. The media separated by a sheet of media may be transferred into the first transfer module 31. The first transfer module 31 may transfer the medium to be deposited to the discrimination module 25.

The medium that is determined as normal by the discrimination module 25 may be transferred to the temporary stacking module 27 by the second transfer module 33 and the third transfer module 37.

On the other hand, the medium that is determined as abnormal by the discrimination module 25 or the medium that is not recognized by the discrimination module 25 may be returned to the medium depositing and withdrawing module 20 by the second transfer module 33 and the third transfer module 37.

When the first deposit process is completed, information (for example, at least one of the sum, kind, and number of media) of the medium that is completely discriminated and stacked in the temporary stacking module 27 may be displayed on the user interface 16.

Also, a deposit confirmation command or deposit cancel command with respect to the medium stacked in the temporary stacking module 27 may be inputted through the user interface 16.

If the deposit confirmation command is inputted through the user interface 16, the medium stacked in the temporary stacking module 27 may be separated by a medium separation device (not shown). The medium separated by the medium separation device may be transferred to the second transfer module 33. The medium transferred to the second transfer module 33 may be transferred to the third path 33 defined by the medium depositing and withdrawing module 20. The medium transferred to the third path 23 may pass again through the discrimination module 25 via the first transfer module 31.

The medium passing again through the discrimination module 25 may be transferred to the fourth transfer module 41 via the second transfer module 33 and the third transfer module 37.

The medium that is determined as normal among the media passing again through the discrimination module 25 may be finally accepted into the medium storage unit 50a by the fourth transfer module 41.

On the other hand, the medium that is determined as abnormal or the medium that is not recognized by the discrimination module 25 among the media passing again through the discrimination module 25 may be collected to the collection module 70 by the fourth transfer module 41.

When the deposit cancel command is inputted through the user interface 16, the media stacked in the temporary stacking module 27 may be separated from each other by the medium separation device (not shown). The medium separated by the medium separation device may return to the medium depositing and withdrawing module 20 via the second transfer module 33.

Figure 11:
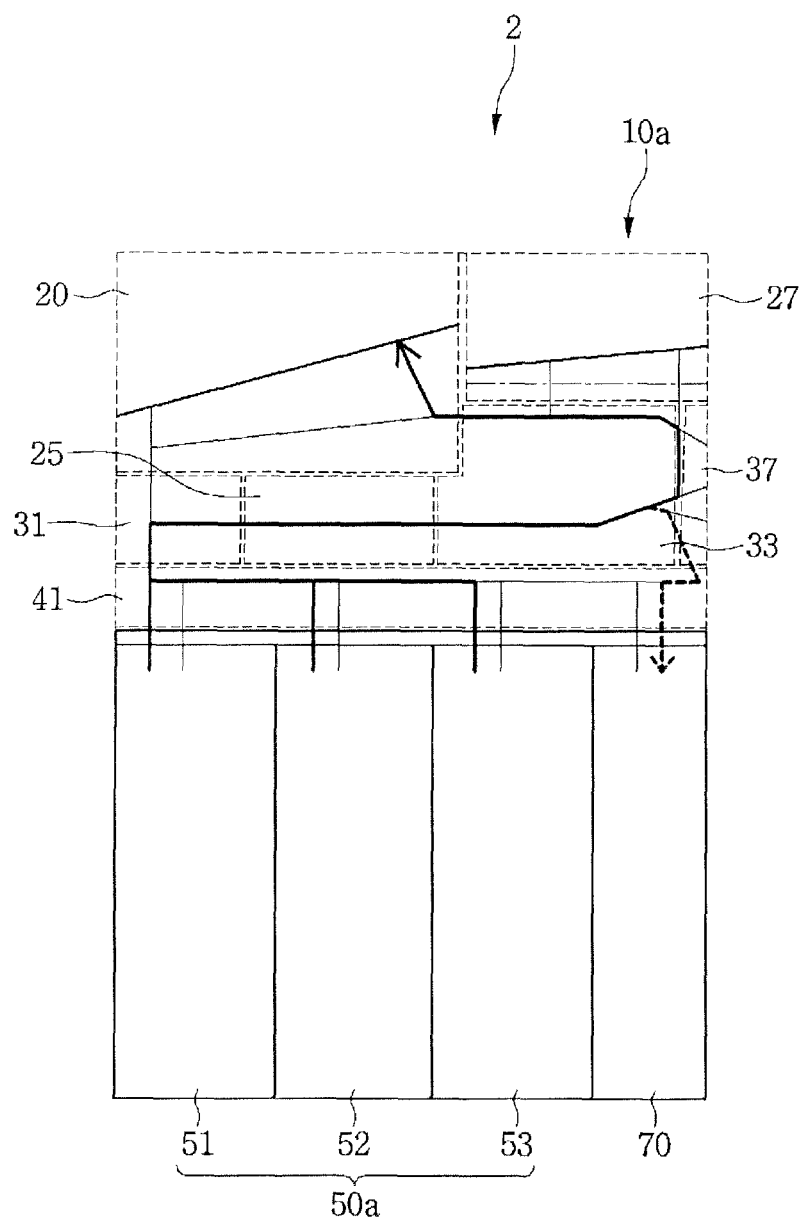
FIG. 11 is a schematic view illustrating a withdrawal process of the financial device of FIG. 8.

FIG. 11 is a schematic view illustrating a withdrawal process of the financial device of FIG. 8.

Referring to FIG. 11, when the medium withdrawal command is inputted through the user interface 16, a kind and the number of medium corresponding to the sum of the medium to be withdrawn may be discharged from the medium storage unit 50a. The medium discharged from the medium storage unit 50a may be transferred along the fourth transfer module 41 to pass through the discrimination module 25 via the first transfer module 31.

The medium determined as normal among the media passing through the discrimination module 25 may be discharged into the medium depositing and withdrawing module 20 by the second and third transfer modules 33 and 37.

On the other hand, the medium that is determined as abnormal or the medium that is not recognized by the discrimination module 25 among the media passing through the discrimination module 25 may be transferred to the fourth transfer module 41 via the second and third transfer modules 33 and 37 and then be finally collected to the collection module 70.

Figure 12:
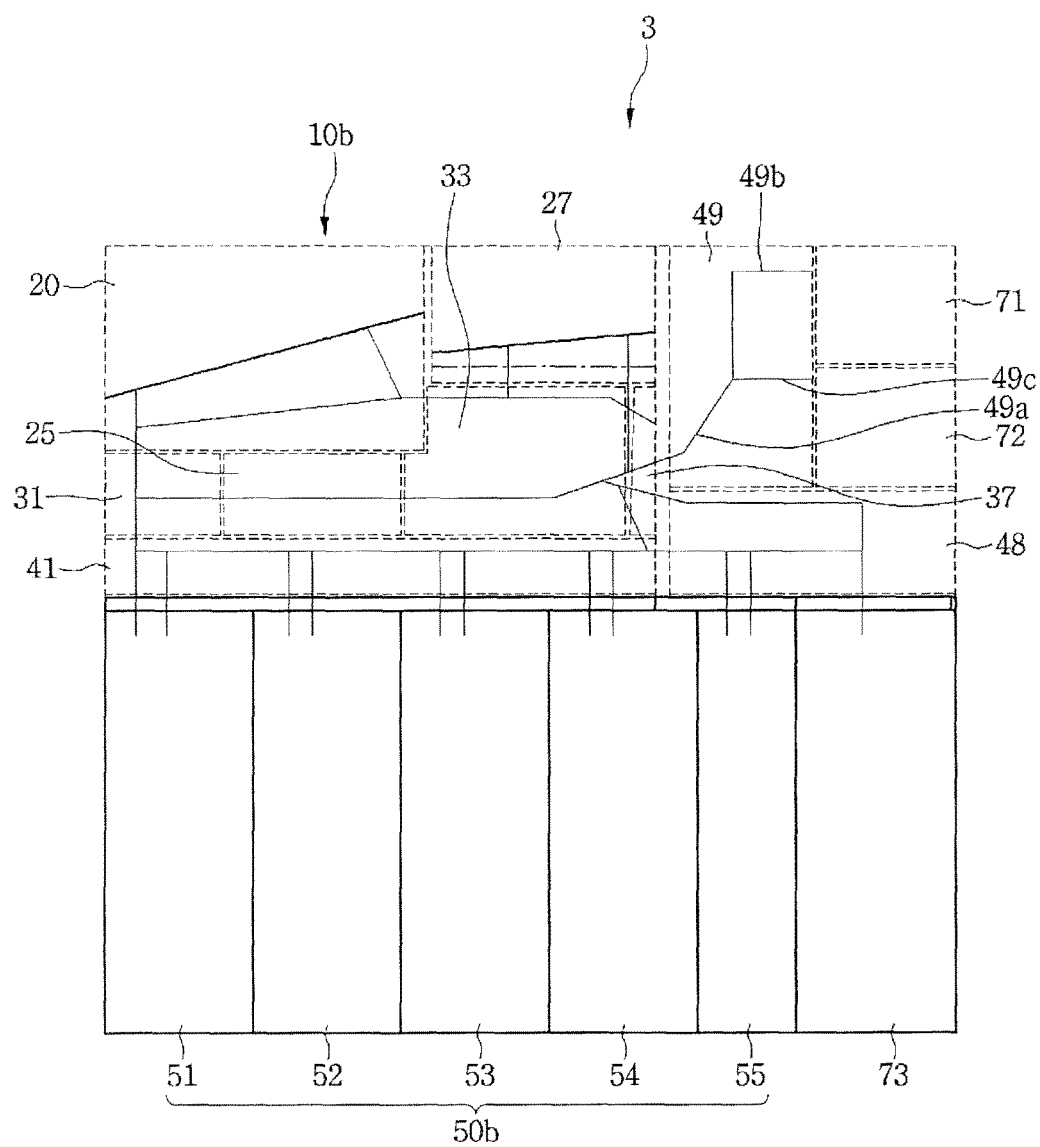
FIG. 12 is a schematic view of the financial device of FIG. 1 which has been transformed into a third configuration.

FIG. 12 is a schematic view of the financial device of FIG. 1 transformed to a third configuration.

Referring to FIG. 12, a financial device 3 having a third configuration comprises a medium processing apparatus 10b having a third configuration.

The medium processing apparatus 10b having the third configuration may comprise the medium depositing and withdrawing module 20, the first transfer module 31, the discrimination module 25, the second transfer module 33, the third transfer module 37, the fourth transfer module 41, and the temporary stacking module 27, which are the common modules.

Also, the medium processing apparatus 10b may further a medium storage unit 50b and a plurality of collection modules 71 to 73.

The number of medium storage modules 51 to 55 constituting the medium storage unit 50b may be greater than that of medium storage modules 51 to 54 constituting the medium storage unit 50 of FIG. 1.

Thus, the financial device having the third configuration may process more kinds of media than those of media processed by the financial device having the first configuration.

The medium processing apparatus 10b may further comprise an eighth transfer module 48 for transferring a medium transferred from the third transfer module 37 to the fourth transfer module 41.

The plurality of collection modules 71 to 73 may comprise a first collection module 71, a second collection module 72, and a third collection module 73.

A medium that is not taken in the withdrawal transaction process may be collected to one of the and second collection modules 71 and 72, and a medium that is not taken even though returns in the deposit transaction process may be collected to the other one of the first and second collection modules 71 and 72. Alternatively, the untaken medium may be stacked in a single collection module. Alternatively, a plurality of collection spaces may be divided in the single collection module. Alternatively, if the untaken medium is collected several times, each of the untaken media may be separately stored.

On the other hand, if a kind of media to be processed in the financial device 3 is large, or the number of medium storage modules 51 to 55 of the medium storage unit 50b is small, the collection modules may be used as additional medium storage modules. Here, if at least one of the first and second collection modules 71 and 72 is a recycling module, a ninth transfer module 49 may be provided to transfer a medium in both directions. If the first and second collection modules 71 and 72 are capable of being stacked without having a medium separation function, the ninth transfer module 49 may transfer the medium in only one direction.

A medium that is determined as abnormal by the discrimination module 25 or a medium that is not recognized by the discrimination module 25 may be collected to the third collection module 73.

The medium processing apparatus 10b may further comprise the ninth transfer module 49 for transferring the untaken medium to the first collection module 71 and the second collection module 72.

The ninth transfer module 49 may be disposed above the eighth transfer module 48 and at a rear side of the temporary stacking module 27 to vertically overlap with at least a portion of the eighth transfer module 48.

The ninth transfer module 49 may be disposed between the temporary stacking module 27 and the first collection module 71.

Also, the ninth transfer module 49 may be disposed between the third transfer module 37 and the second collection module 72.

The eighth transfer module 48 may be disposed under the second collection module 72 and above the third collection module 73. That is, at least a portion of the eighth transfer module may be disposed between the first or second collection module 71 or 72 and the third collection module 73.

Also, the eighth transfer module 48 may be disposed to vertically overlap with at least one medium storage module 55. Also, the eighth transfer module 48 may be disposed to vertically overlap with at least a portion of the third collection module 73.

The ninth transfer module 49 may comprise a common path 49a and first and second branch paths 49b and 49c branched from the common path 49a.

The first branch path 49b may be connected to the first collection module 71, and the second branch path 49c may be connected to the second collection module 72.

Figure 13:
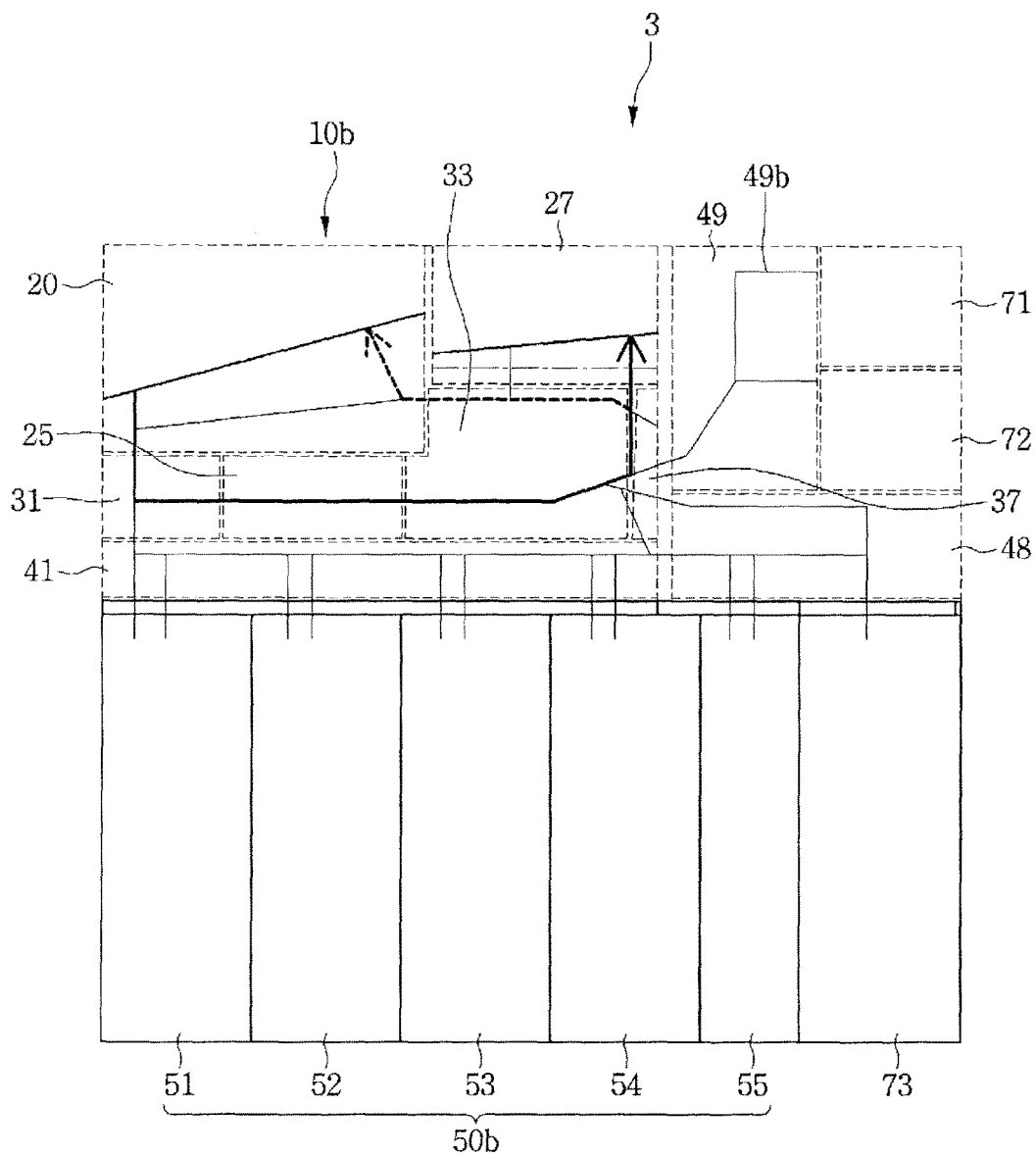
FIG. 13 is a schematic view illustrating a first deposit process of the financial device of FIG. 12.
Figure 14:
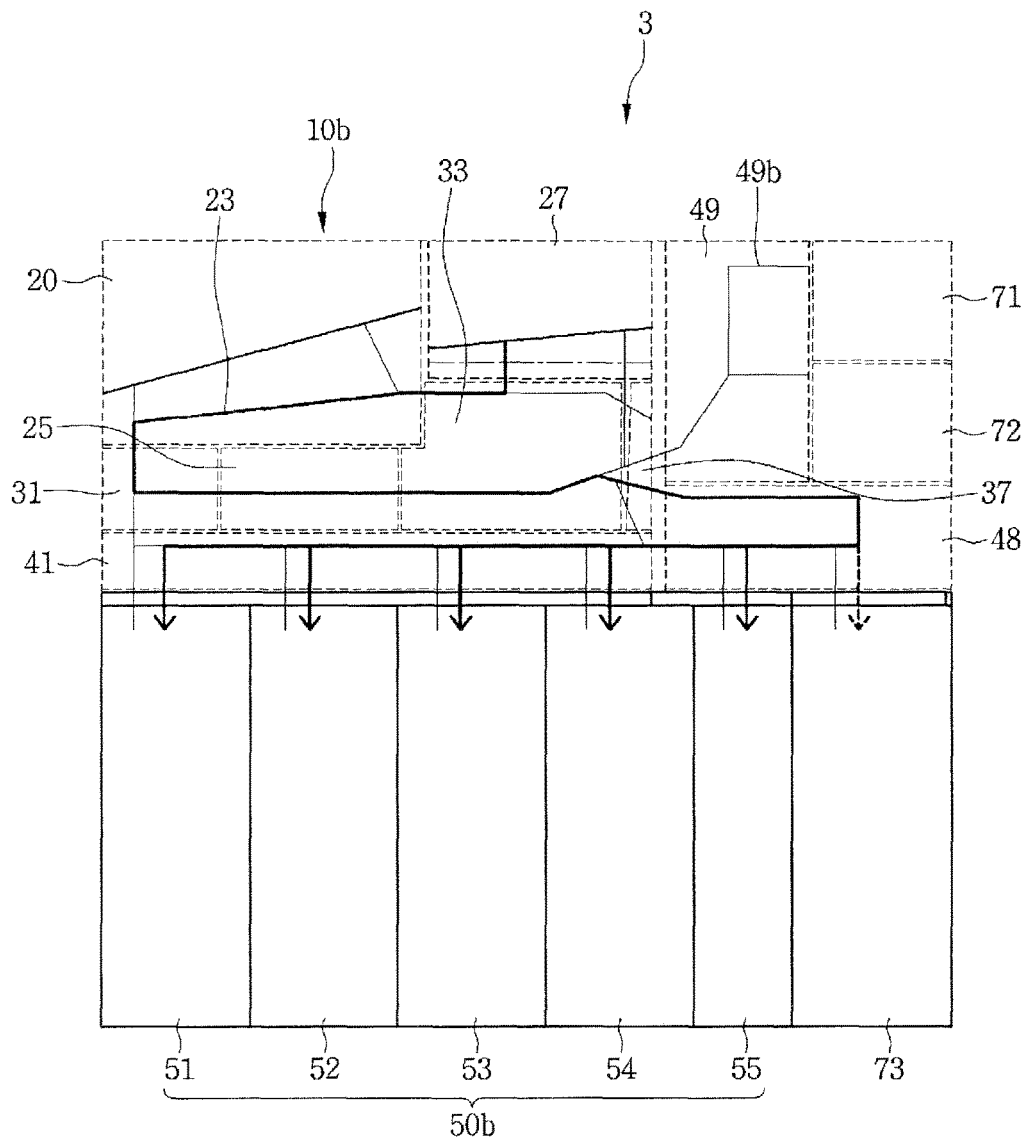
FIG. 14 is a schematic view illustrating a second deposit process of the financial device of FIG. 12.

FIG. 13 is a schematic view illustrating a first deposit process of the financial device of FIG. 12, and FIG. 14 is a schematic view illustrating a second deposit process of the financial device of FIG. 12.

Referring to FIGS. 13 and 14, to perform deposit transaction of a medium, media may be accepted into a medium depositing space of the medium depositing and withdrawing module 20.

The media accepted into the medium depositing space may be separated by a sheet of media by a medium separation device. The media separated by a sheet of media may be transferred into the first transfer module 31. The first transfer module 31 may transfer the medium to be deposited to the discrimination module 25.

The medium that is determined as normal by the discrimination module 25 may be transferred to the temporary stacking module 27 by the second transfer module 33 and the third transfer module 37.

On the other hand, the medium that is determined as abnormal by the discrimination module 25 or the medium that is not recognized by the discrimination module 25 may be returned to the medium depositing and withdrawing module 20 by the second transfer module 33 and the third transfer module 37.

When the first deposit process is completed, information of the medium that is completely discriminated and stacked in the temporary stacking module 27 and information of the medium that is returned to the medium depositing and withdrawing module 20 may be displayed on the user interface 16.

Also, a deposit confirmation command or deposit cancel command with respect to the medium stacked in the temporary stacking module 27 may be inputted through the user interface 16.

If the deposit confirmation command is inputted through the user interface 16, the medium stacked in the temporary stacking module 27 may be separated by a medium separation device (not shown). The medium separated by the medium separation device may be transferred to the second transfer module 33. The medium transferred to the second transfer module 33 may be transferred to the third path 33 defined by the medium depositing and withdrawing module 20. The medium transferred to the third path 23 may pass again through the discrimination module 25 via the first transfer module 31.

The medium passing again through the discrimination module 25 may be transferred to the eighth transfer module 48 via the second transfer module 33 and the third transfer module 37.

The medium that is determined as normal among the media passing again through the discrimination module 25 may be directly transferred to the fifth medium storage module 55 by the eighth transfer module 48 or be transferred to one of the first to fourth medium storage modules 51 to 54 after being transferred to the fourth transfer module 41 by the eighth transfer module 48 according to the kinds of media.

On the other hand, the medium that is determined as abnormal or the medium that is not recognized by the discrimination module 25 among the media passing again through the discrimination module 25 may be collected to the third collection module 73 by the eighth transfer module 48.

When the deposit cancel command is inputted through the user interface 16, the media stacked in the temporary stacking module 27 may be separated from each other by the medium separation device (not shown). The medium separated by the medium separation device may return to the medium depositing and withdrawing module 20 via the second transfer module 33.

Figure 15:
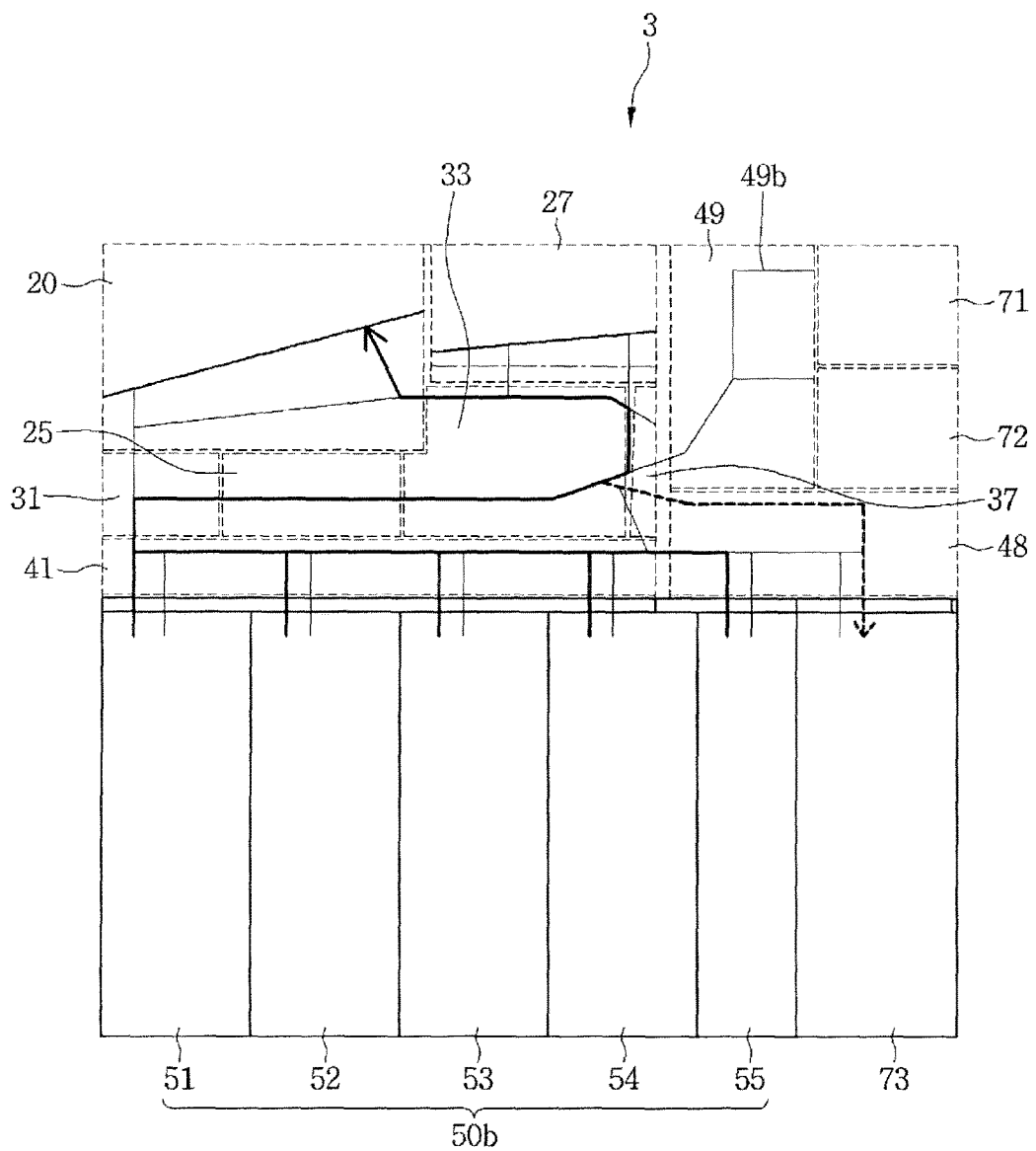
FIG. 15 is a schematic view illustrating a withdrawal process of the financial device of FIG. 12.

FIG. 15 is a schematic view illustrating a withdrawal process of the financial device of FIG. 12.

Referring to FIG. 15, when the medium withdrawal command is inputted through the user interface 16, a kind and the number of medium corresponding to the sum of the medium to be withdrawn may be discharged from the medium storage unit 50b. The medium discharged from the fifth medium storage module 55 among the media discharged from the medium storage unit 50b may be transferred to the fourth transfer module 41 via the eighth transfer module 48.

The medium discharged from at least one of the first to fourth medium storage modules 50 to 54 among the media discharged from the medium storage unit 50b may be directly transferred to the fourth transfer module 41.

The medium transferred to the fourth transfer module 41 may pass through the discrimination module 25 via the first transfer module 31.

The medium determined as normal among the media passing through the discrimination module 25 may be discharged into the medium depositing and withdrawing module 20 by the second and third transfer modules 33 and 37.

On the other hand, the medium that is determined as abnormal or the medium that is not recognized by the discrimination module 25 among the media passing through the discrimination module 25 may be transferred to the eighth transfer module 48 via the second and third transfer modules 33 and 37 and then finally collected to the third collection module 73.

Figure 16:
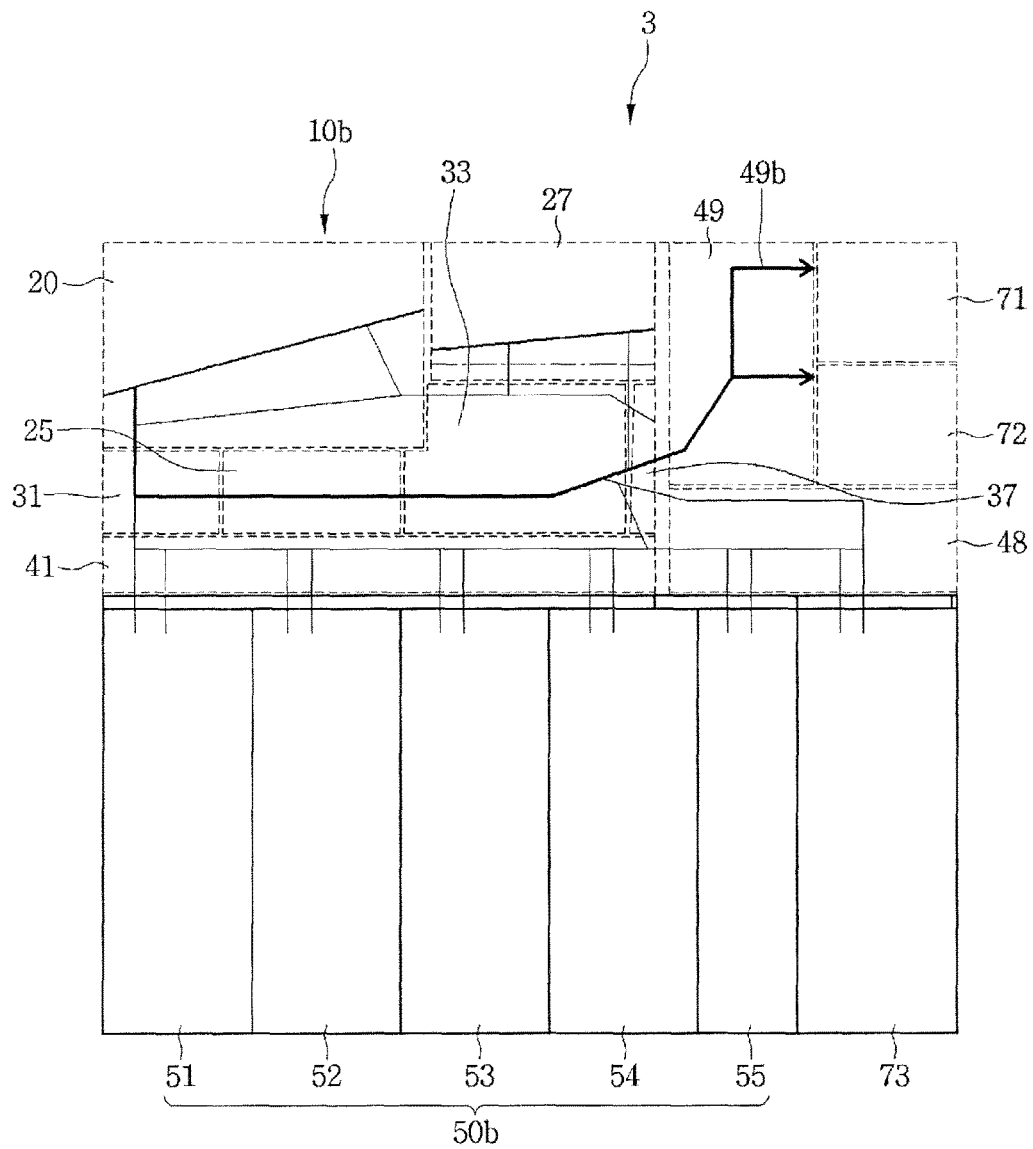
FIG. 16 is a schematic view illustrating a process of collecting an untaken medium in the financial device of FIG. 12.

FIG. 16 is a schematic view illustrating a process of collecting an untaken medium in the financial device of FIG. 12.

Referring to FIG. 16, when the customer does not take the medium discharged from the medium depositing and withdrawing module 20, the untaken medium may be transferred to the discrimination module 25 by the first transfer module 31. The untaken medium that passes through the discrimination module 25 may be transferred to the ninth transfer module 49 by the second and third transfer modules 33 and 37 and then be finally collected to the first or second collection module 71 or 72 according to the kinds of untaken media.

Figure 17:
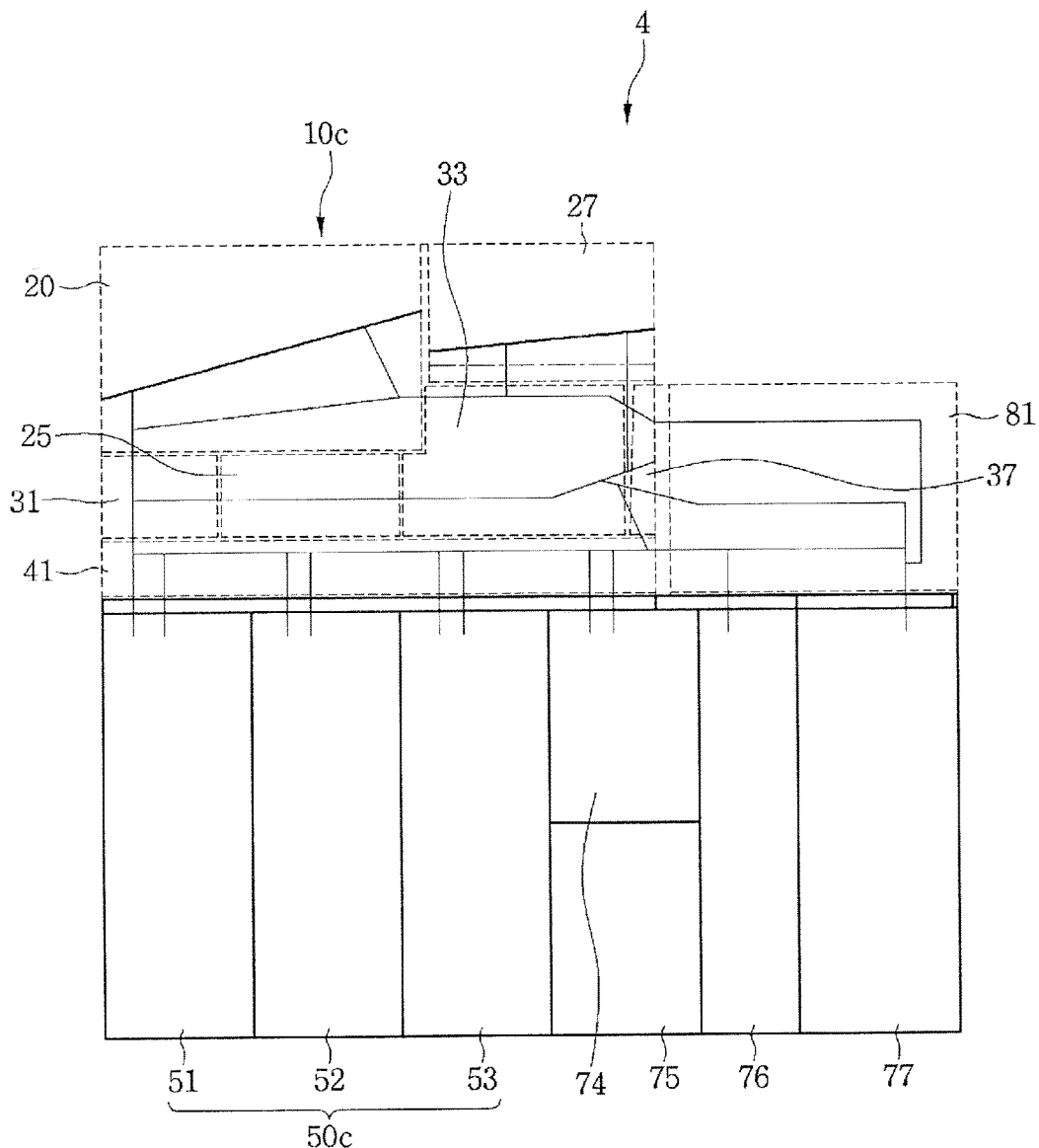
FIG. 17 is a schematic view of the financial device of FIG. 1 which has been transformed into a fourth configuration.

FIG. 17 is a schematic view of the financial device of FIG. 1 transformed into a fourth configuration.

Referring to FIG. 17, a financial device 4 having a fourth configuration comprises a medium processing apparatus 10c having a fourth configuration.

The medium processing apparatus 10c having the fourth configuration may comprise the medium depositing and withdrawing module 20, the first transfer module 31, the discrimination module 25, the second transfer module 33, the third transfer module 37, the fourth transfer module 41, and the temporary stacking module 27, which are the common modules.

Also, the medium processing apparatus 10c may further comprise a medium storage unit 50c and at least one collection module.

The number of medium storage modules 51 to 53 constituting the medium storage unit 50c may be less than that of medium storage modules 51 to 54 constituting the medium storage unit 50 of FIG. 1.

The medium processing apparatus 10c may further comprise a tenth module 81 for transferring a medium transferred from the third transfer module 37 to the fourth transfer module 41.

Although not limited thereto, the at least one collection module may comprise a first collection module 74, a second collection module 75, and a third collection module 76.

The first collection module 74 and the second collection module 75 may be vertically arranged. Also, each of the first and second collection modules 74 and 75 may be horizontally arranged with respect to the third collection module 76.

The medium processing apparatus 10c may further comprise an additional function module 77 for stacking at least one medium of a medium to be replenished and a collected medium.

The additional function module 77 may be horizontally arranged with respect to the third collection module 76.

The tenth transfer module 81 may be disposed above at least one collection module 76 and the additional function module 77 to vertically overlap with at least a portion of each of the at least one collection module 76 and the additional function module 77.

The tenth transfer module 81 may directly transfer the medium transferred from the third transfer module 37 to the additional function module 77 or directly transfer the medium transferred from the additional function module 77 to the third transfer module 37.

A medium that is not taken in the withdrawal transaction process may be collected to one of the plurality of collection modules 74 to 76, and a medium that is not taken even though the medium returns to the deposit transaction process may be collected to another collection module. Also, a medium that is determined as abnormal or a medium that is not recognized by the discrimination module 25 may be collected to further another collection module. Alternatively, like the collection module that is described in the financial device having the third configuration, the collection modules may be used as additional medium storage modules.

Figure 18:
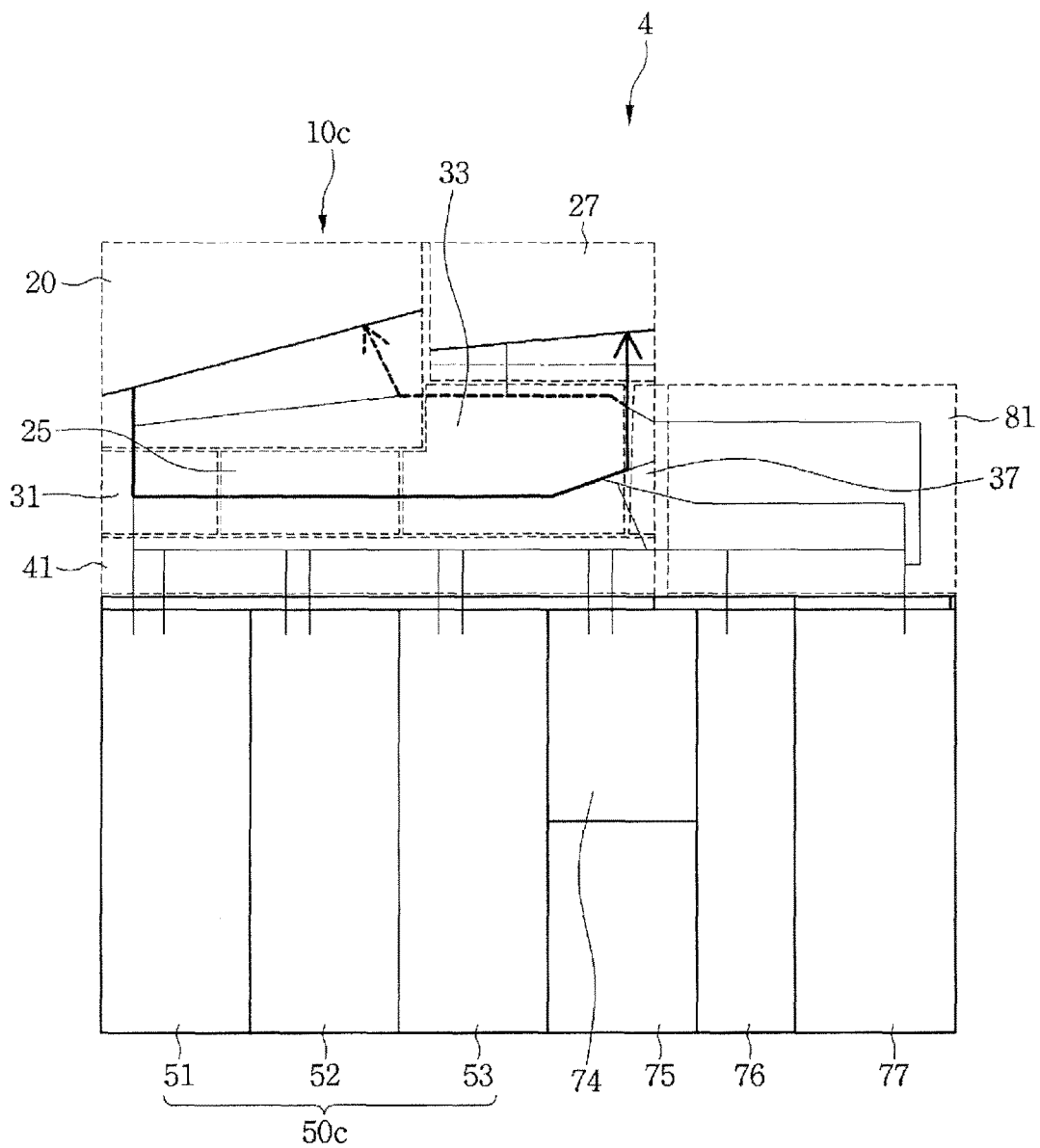
FIG. 18 is a schematic view illustrating a first deposit process of the financial device of FIG. 17.
Figure 19:
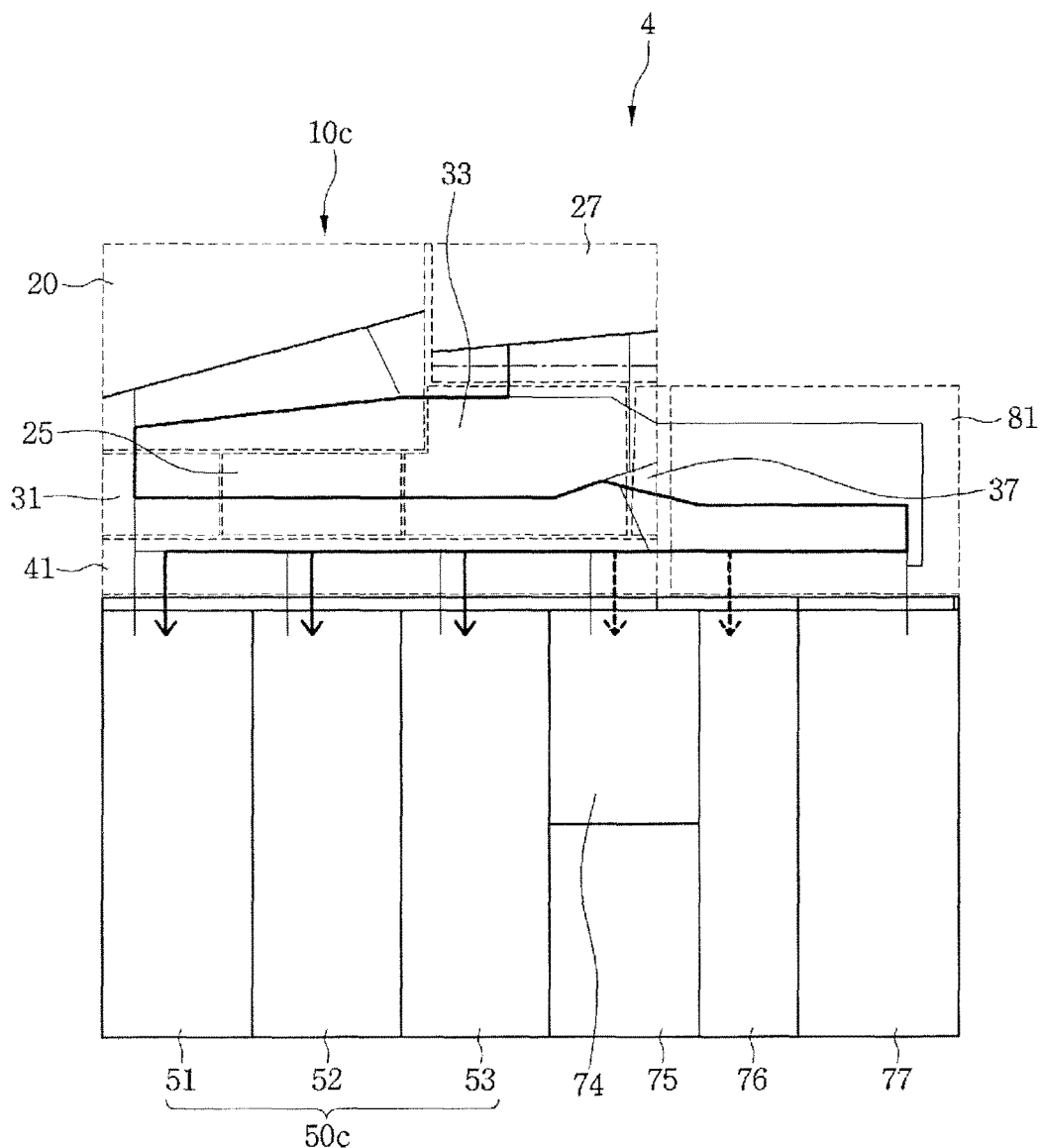
FIG. 19 is a schematic view illustrating a second deposit process of the financial device of FIG. 17.

FIG. 18 is a schematic view illustrating a first deposit process of the financial device of FIG. 17, and FIG. 19 is a schematic view illustrating a second deposit process of the financial device of FIG. 17.

Referring to FIGS. 18 and 19, to perform deposit transaction of a medium, media may be accepted into a medium depositing space of the medium depositing and withdrawing module 20.

The media accepted into the medium depositing space may be separated by a sheet of media by a medium separation device. The media separated by a sheet of media may be transferred into the first transfer module 31. The first transfer module 31 may transfer the medium to be deposited to the discrimination module 25.

The medium that is determined as normal by the discrimination module 25 may be transferred to the temporary stacking module 27 by the second transfer module 33 and the third transfer module 37.

On the other hand, the medium that is determined as abnormal by the discrimination module 25 or the medium that is not recognized by the discrimination module 25 may be returned to the medium depositing and withdrawing module 20 by the second transfer module 33 and the third transfer module 37.

When the first deposit process is completed, information of the medium that is completely discriminated and stacked in the temporary stacking module 27 and information of the medium that is returned to the medium depositing and withdrawing module 20 may be displayed on the user interface 16.

Also, a deposit confirmation command or deposit cancel command with respect to the medium stacked in the temporary stacking module 27 may be inputted through the user interface 16.

If the deposit confirmation command is inputted through the user interface 16, the medium stacked in the temporary stacking module 27 may be separated by a medium separation device (not shown). The medium separated by the medium separation device may be transferred to the second transfer module 33. The medium transferred to the second transfer module 33 may be transferred to the third path 33 defined by the medium depositing and withdrawing module 20. The medium transferred to the third path 23 may pass again through the discrimination module 25 via the first transfer module 31.

The medium passing through the discrimination module 25 may be transferred to the tenth transfer module 81 via the second transfer module 33 and the third transfer module 37.

The medium that is determined as normal among the media passing again through the discrimination module 25 may be transferred to one module of the first to third medium storage modules 51 to 53 after being transferred from the tenth transfer module 81 to the fourth transfer module 41.

On the other hand, the medium that is determined as abnormal or the medium that is not recognized by the discrimination module 25 among the media passing again through the discrimination module 25 may be transferred to the third collection module 76 by the tenth transfer module 81 or be transferred to the first or second collection module 74 or 75 after being transferred from the tenth transfer module 81 to the fourth transfer module 41.

When the deposit cancel command is inputted through the user interface 16, the media stacked in the temporary stacking module 27 may be separated from each other by the medium separation device (not shown). The medium separated by the medium separation device may return to the medium depositing and withdrawing module 20 via the second transfer module 33.

Figure 20:
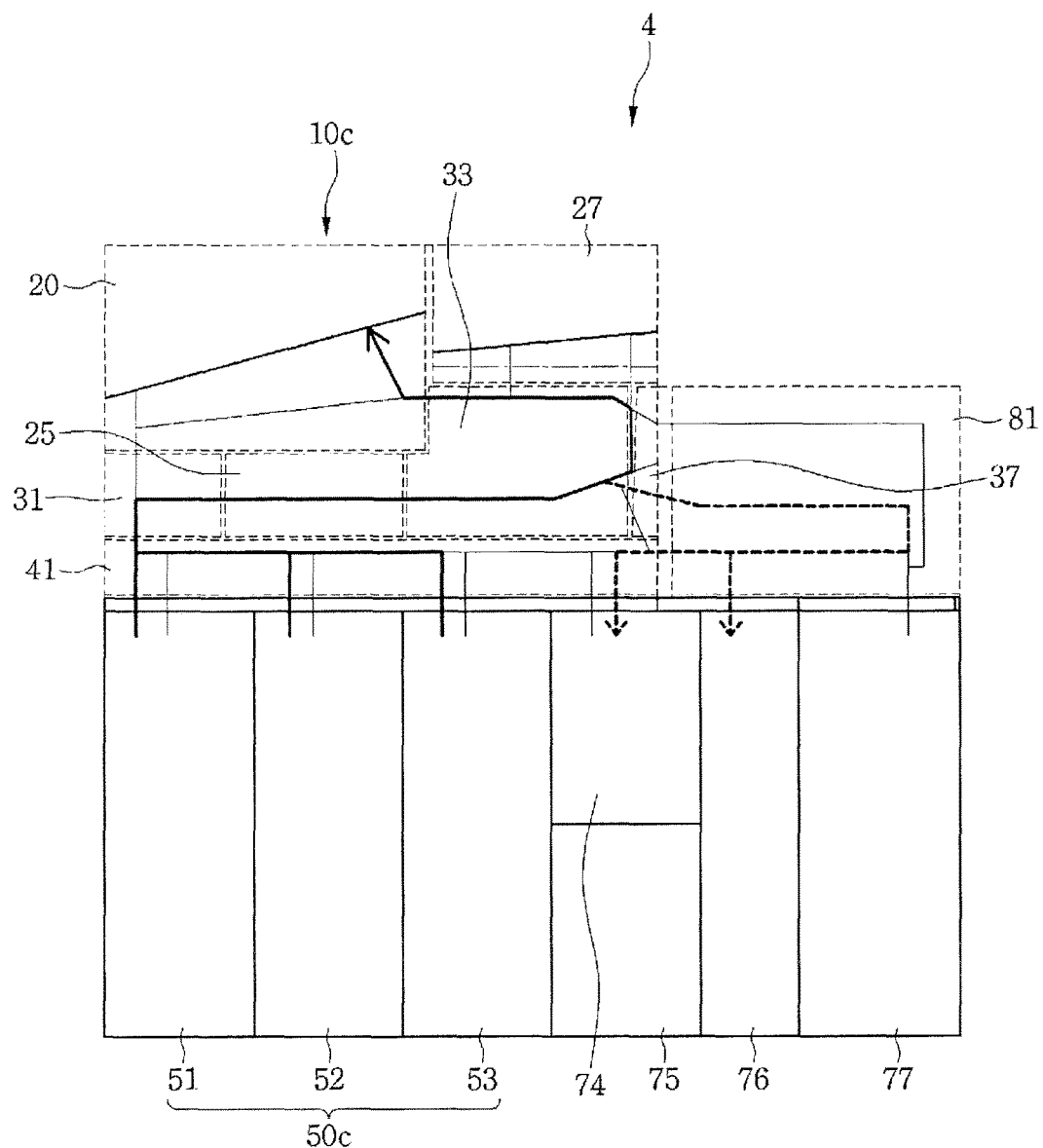
FIG. 20 is a schematic view illustrating a withdrawal process of the financial device of FIG. 17.

FIG. 20 is a schematic view illustrating a withdrawal process of the financial device of FIG. 17.

Referring to FIG. 20, when the medium withdrawal command is inputted through the user interface 16, a kind and the number of medium corresponding to the sum of the medium to be withdrawn may be discharged from the medium storage unit 50c. The medium discharged from the medium storage unit 50c may be transferred to the first transfer module 31 via the fourth transfer module 41. The medium transferred to the first transfer module 31 may pass through the discrimination module 25.

The medium determined as normal among the media passing through the discrimination module 25 may be discharged into the medium depositing and withdrawing module 20 by the second and third transfer modules 33 and 37.

On the other hand, the medium that is determined as abnormal or the medium that is not recognized by the discrimination module 25 among the media passing through the discrimination module 25 may be transferred to the tenth transfer module 81 via the second and third transfer modules 33 and 37. Also, the medium transferred to the tenth transfer module 81 may be directly transferred to the third collection module 76 or be transferred to the first or second collection module 74 or 75 via the fourth transfer module 41 according to kinds thereof.

Figure 21:
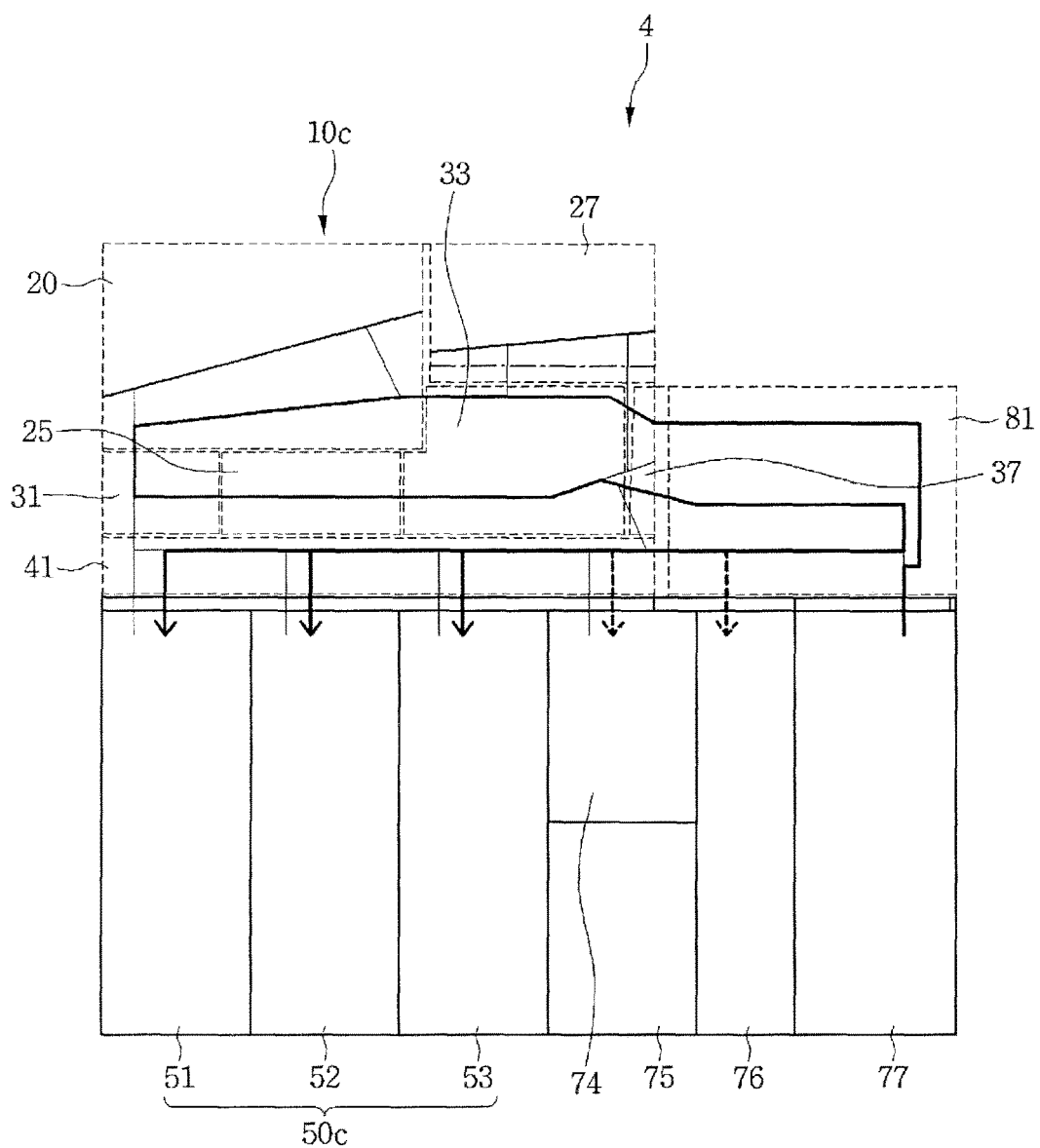
FIG. 21 is a schematic view illustrating a process of replenishing a medium in the financial device of FIG. 17.

FIG. 21 is a schematic view illustrating a process of replenishing a medium in the financial device of FIG. 17.

Referring to FIG. 21, when the medium replenishment command is inputted through a teller interface (not shown) or the user interface receives the medium replenishment command, the media stacked in the additional function module 77 are discharged from the additional function module 77.

The medium of the additional function module 77 may be transferred to the tenth transfer module 81. The medium to be replenished, which is transferred to the tenth transfer module 81 may be transferred to the second transfer module 33 via the third transfer module 37. The medium transferred to the second transfer module 33 may pass through a third path 23 defined by the medium depositing and withdrawing module 20. The medium to be replenished, which passes through the medium depositing and withdrawing module 20 may pass through the discrimination module 25 by the first transfer module 31.

The medium to be replenished, which passes through the discrimination module 25, may be transferred to the tenth transfer module 81 via the second and third transfer modules 33 and 37.

The medium that is determined as normal among the media to be replenished, which pass through the discrimination module 25 may be transferred to the fourth transfer module 41 by the tenth transfer module 81. Also, the medium transferred to the fourth transfer module 41 may be finally accepted into the medium storage unit 50c.

On the other hand, the medium that is determined as abnormal or the medium that is not recognized by the discrimination module 25 among the media to be replenished, which pass again through the discrimination module 25 may be directly transferred to the third collection module 76 by the tenth transfer module 81 or be transferred to the first or second collection module 74 or 75 after being transferred to the fourth transfer module 41.

Figure 22:
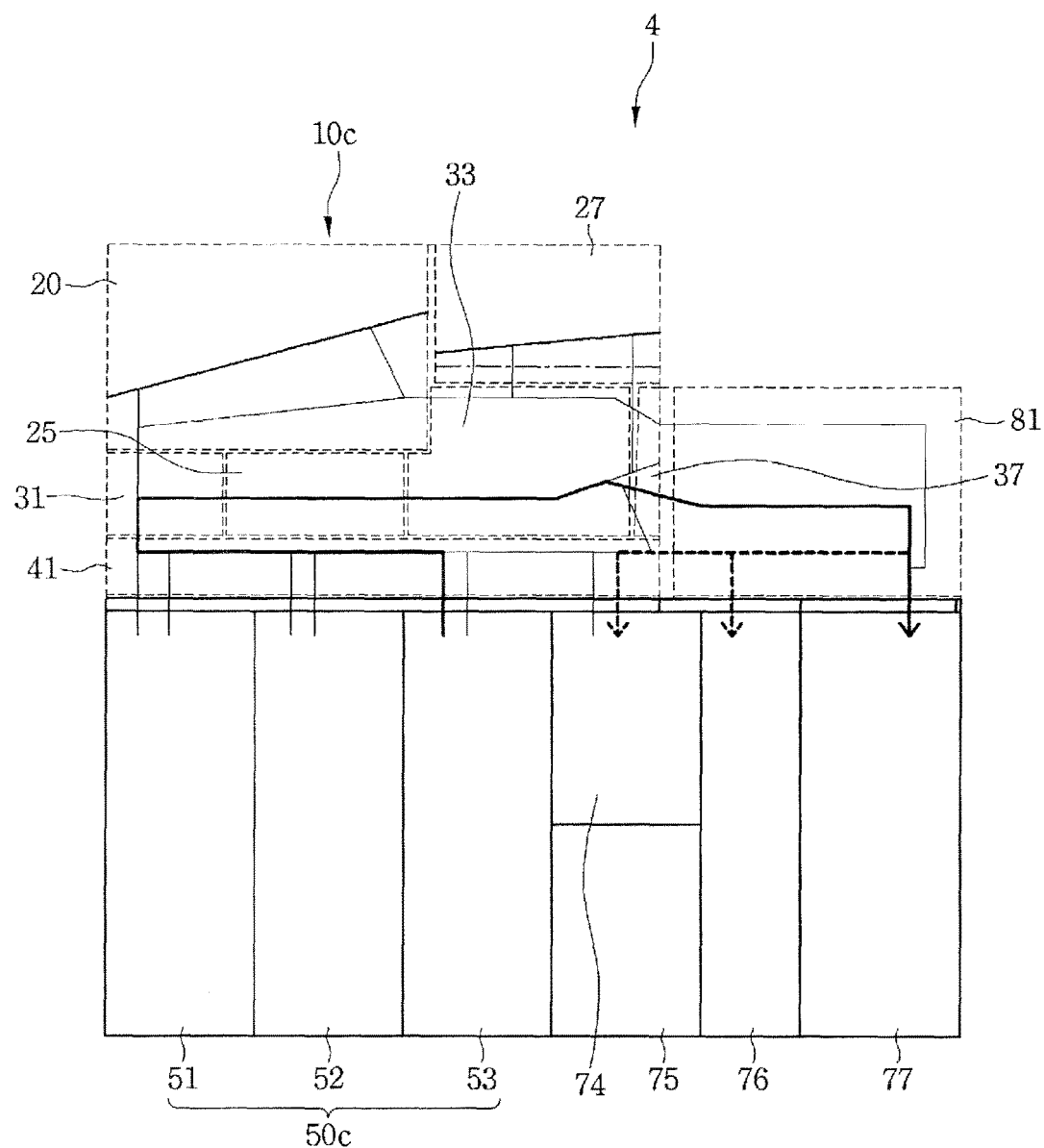
FIG. 22 is a schematic view illustrating a process of collecting a medium in the financial device of FIG. 17.

FIG. 22 is a schematic view illustrating a process of collecting a medium in the financial device of FIG. 17.

Referring to FIG. 22, when the medium collection command is inputted through the teller interface or the user interface receives the medium collection command, the media stacked in at least one medium storage module of the plurality of medium storage modules 51 to 53 may be discharged and then transferred to the fourth transfer module 41. The medium to be collected, which is transferred to the fourth transfer module 41 may pass through the discrimination module 25 via the first transfer module 31.

The medium that is determined as normal among the media to be collected, which pass through the discrimination module 25 may be transferred to the tenth transfer module 81 by the second and third transfer modules 33 and 37, and then be finally collected to the additional function module 77.

On the other hand, the medium that is determined as abnormal or the medium that is not recognized by the discrimination module 25 among the media to be collected, which pass again through the discrimination module 25 may be directly transferred to the third collection module 76 by the tenth transfer module 81 or be transferred to the first or second collection module 74 or 75 after being transferred to the fourth transfer module 41.

Although the first collection module and the second collection module are provided as separate modules in the medium processing apparatus having the fourth configuration, the present disclosure is not limited thereto. For example, the first and second collection modules may be integrated as one collection module. Alternatively, a plurality of collection spaces may be divided in a single collection module.

Figure 23:
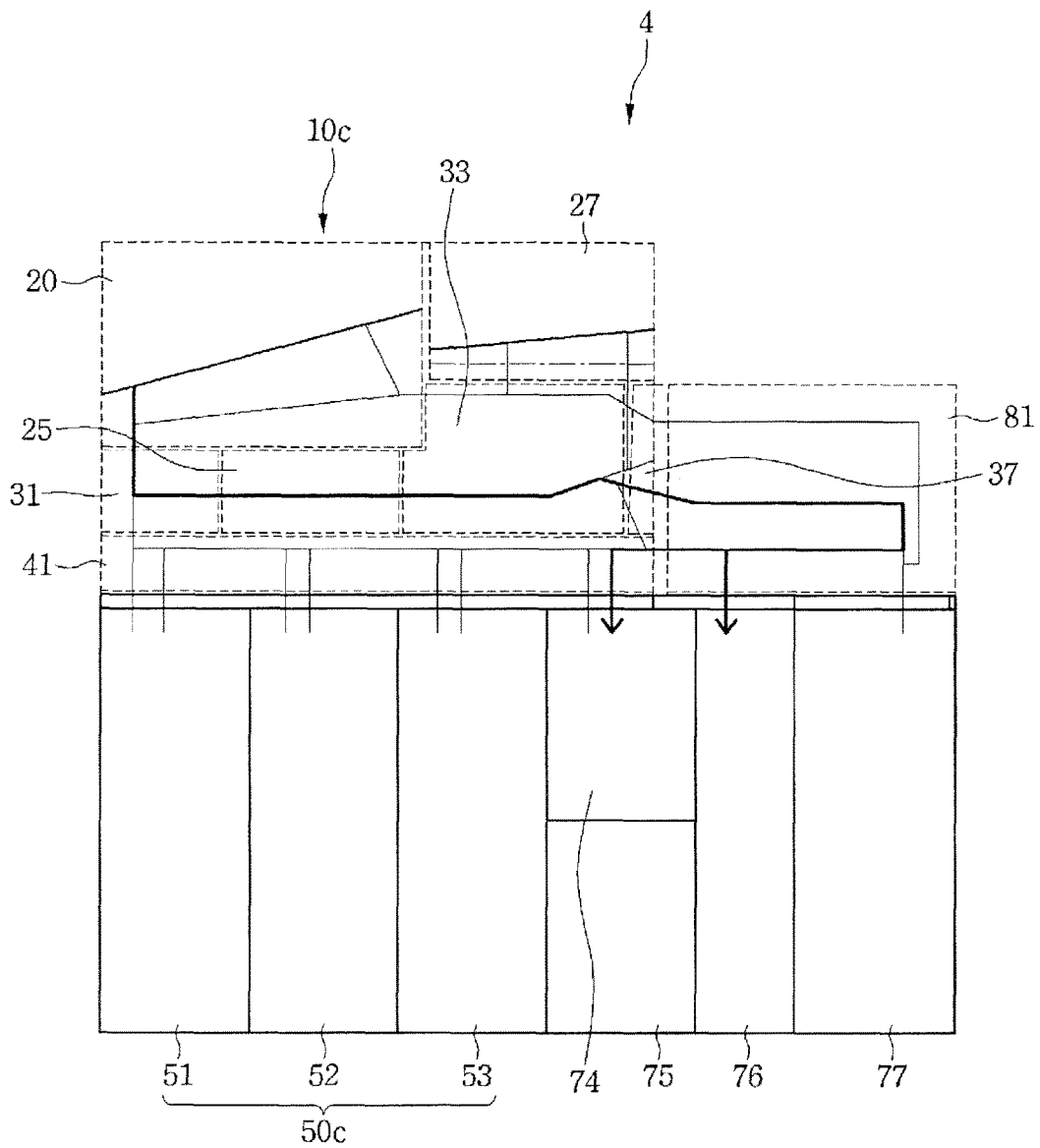
FIG. 23 is a schematic view illustrating a process of collecting an untaken medium in the financial device of FIG. 17.

FIG. 23 is a schematic view illustrating a process of collecting an untaken medium in the financial device of FIG. 17.

Referring to FIG. 23, when the customer does not take the medium discharged from the medium depositing and withdrawing module 20, the untaken medium may be transferred to the discrimination module 25 by the first transfer module 31. The untaken medium passing through the discrimination module 25 may be transferred to the tenth transfer module 81 by the second transfer module 33 and the third transfer module 37.

Also, the medium transferred to the tenth transfer module 81 may be directly transferred to the third collection module 76 or be transferred to the first or second collection module 74 or 75 via the fourth transfer module 41.

According to the financial device having the fourth configuration, the additional function module for replenishing and/or collecting a medium may be disposed at the most rear side of the financial device. Thus, the teller or manager who opens the door may easily access the additional function module.

Also, the medium storage unit 50c may be accommodated in a cash box, and the additional function module may be disposed in the cash box to improve safety with respect to the additional function module.

Figure 24:
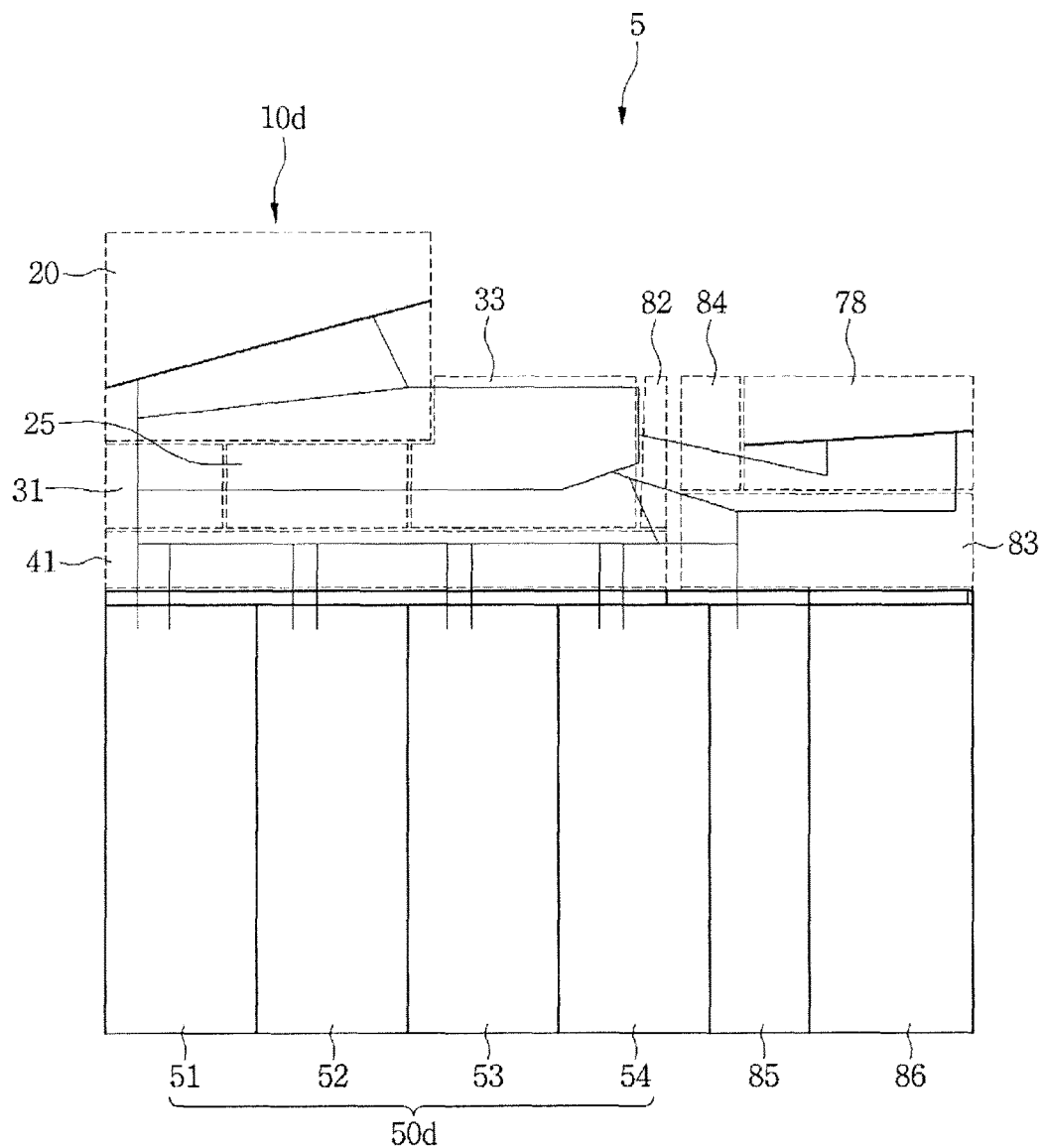
FIG. 24 is a schematic view of the financial device of FIG. 1 which has been transformed into a fifth configuration.

FIG. 24 is a schematic view of the financial device of FIG. 1 transformed into a fifth configuration.

Referring to FIG. 24, a financial device 5 having a fifth configuration comprises a medium processing apparatus 10d having a fifth configuration.

The financial device having the fifth configuration may be a teller financial device that is transformed from the customer financial device having the first configuration.

The medium processing apparatus 10d having the fifth configuration may comprise the medium depositing and withdrawing module 20, the first transfer module 31, the discrimination module 25, the second transfer module 33, and the fourth transfer module 41 of the common modules.

Also, the medium processing apparatus 10d may further comprise a medium storage unit 50d and a temporary stacking module 78. Here, the temporary stacking module 78 of the financial device 5 may be the same module as the temporary stacking module 27 having the first configuration. Alternatively, at least one path of the introduction path and the withdrawal path of the temporary stacking module 27 having the first configuration may be different. For example, the temporary stacking module 27 having the first configuration may be designed so that the introduction path and the withdrawal path are disposed at a lower side, and the temporary stacking module 78 having the fifth configuration may be designed so that an inlet of at least one path of the introduction path and the withdrawal path is disposed on a surface different from that of the other inlet of the other path.

Alternatively, when the medium depositing and withdrawing module 20 also performs the function of the temporary stacking module, the temporary stacking module 78 may not be provided.

The medium processing apparatus 10d may further comprise an eleventh transfer module 82, a twelfth transfer module 83, and a thirteenth transfer module 84.

The eleventh transfer module 82 may be disposed at a rear side of the second transfer module 33, and the thirteenth transfer module 84 may be disposed at a rear side of the eleventh transfer module 82. Also, the temporary stacking module 78 may be disposed at a rear side of the thirteenth transfer module 84.

The eleventh transfer module 82 may be disposed above the fourth transfer module 41 to vertically overlap with at least a portion of the fourth transfer module 41.

The twelfth transfer module 83 may be disposed above the thirteenth transfer module 84 and the temporary stacking module 78.

At least a portion of the thirteenth transfer module 84 and the temporary stacking module 78 may be disposed to vertically overlap with the twelfth transfer module 83.

The medium processing apparatus 10d may further comprise a collection module 86 for collecting a medium that is determined as abnormal and a medium that is not recognized by the discrimination module and a fourteenth transfer module 85 for guiding the medium transferred by the twelfth transfer module 83 to the collection module 86.

The fourteenth transfer module 85 and the collection module 86 may be disposed under the twelfth transfer module 83, and at least a portion of the fourteenth transfer module 85 and the collection module 86 may be disposed to vertically overlap with the twelfth transfer module 83.

Also, the fourteenth transfer module 85 and the collection module 86 may be horizontally arranged with respect to the plurality of medium storage modules 51 to 54.

Figure 25:
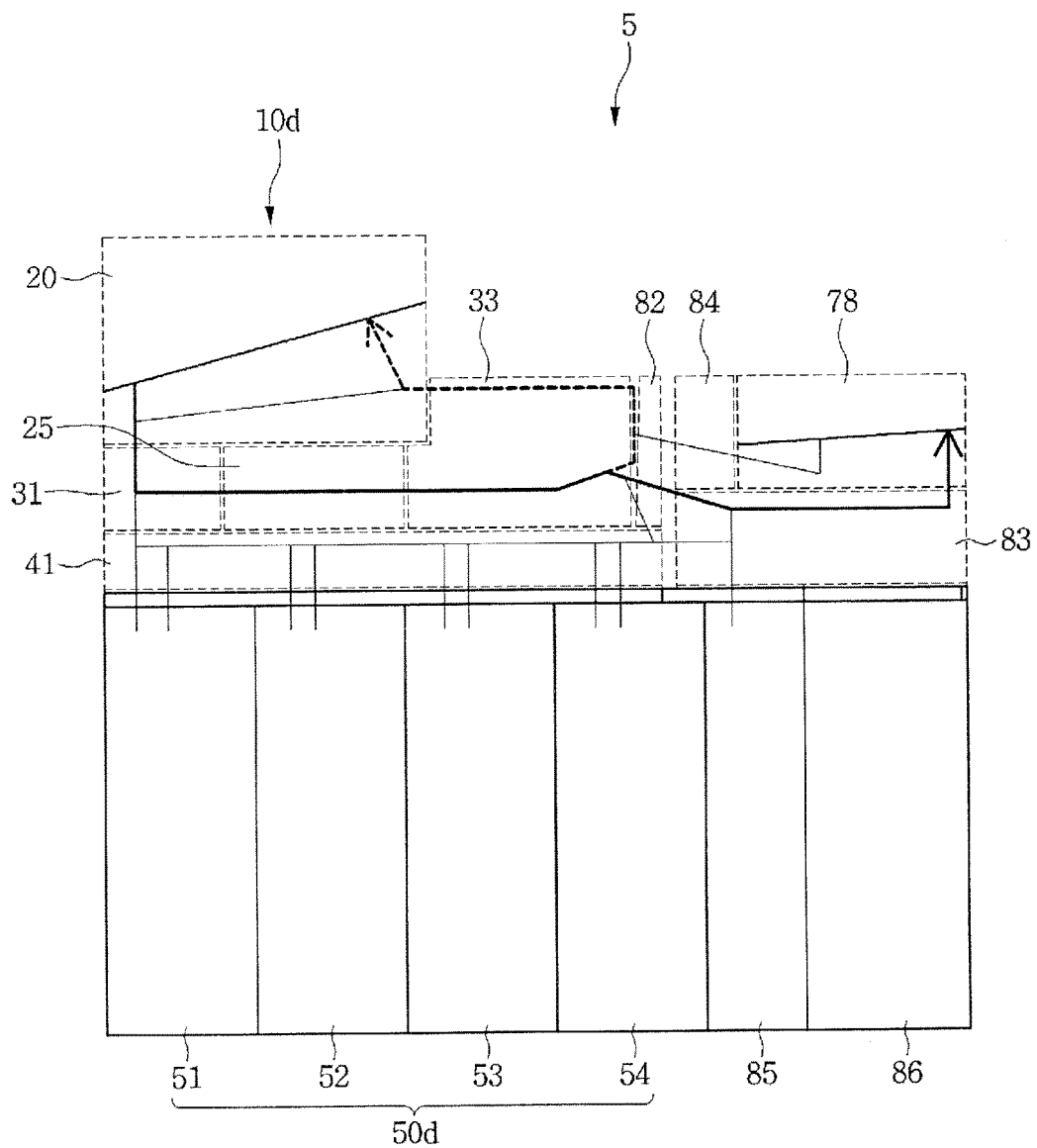
FIG. 25 is a schematic view illustrating a first deposit process of the financial device of FIG. 24.
Figure 26:
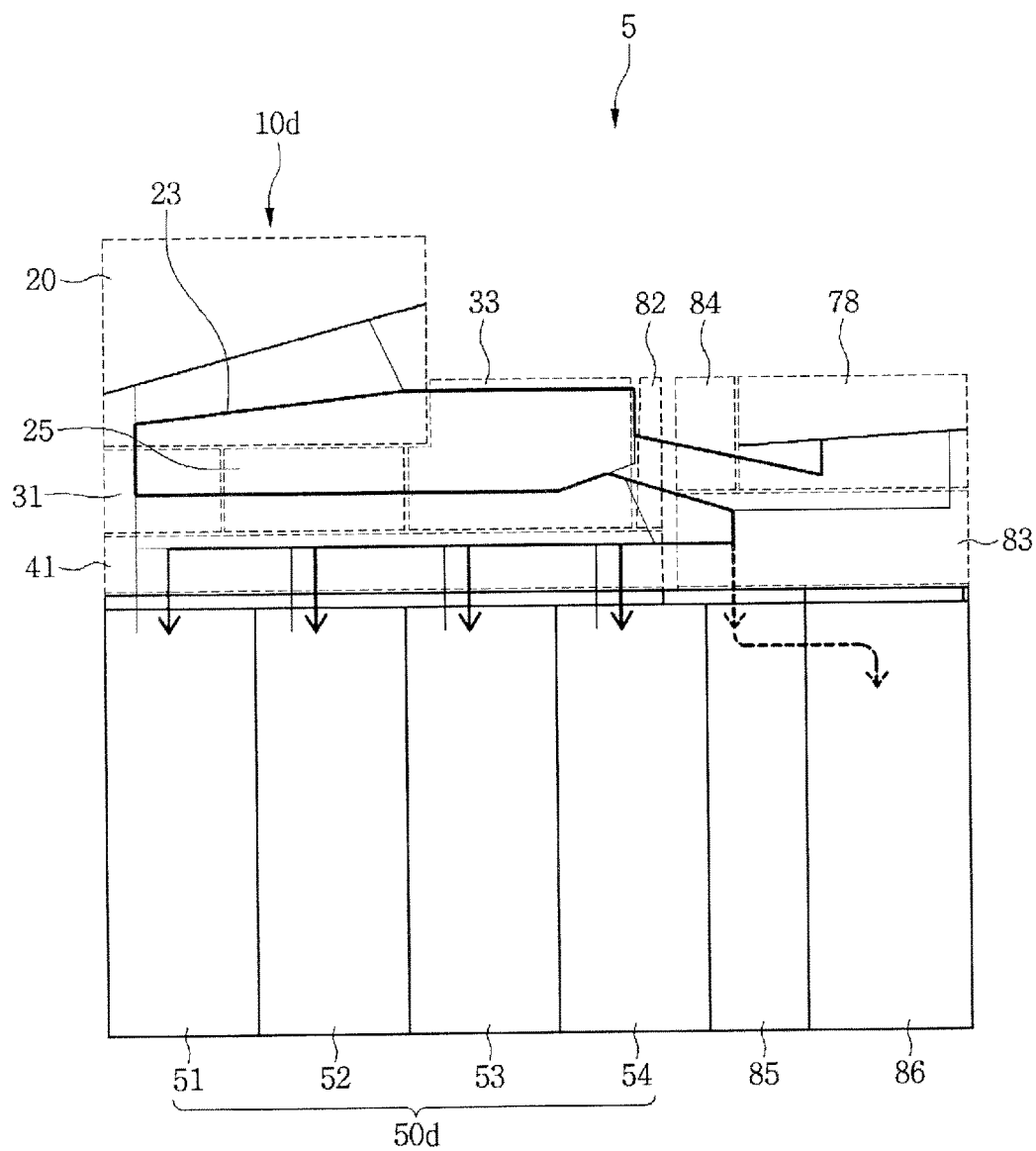
FIG. 26 is a schematic view illustrating a second deposit process of the financial device of FIG. 24.

FIG. 25 is a schematic view illustrating a first deposit process of the financial device of FIG. 24, and FIG. 26 is a schematic view illustrating a second deposit process of the financial device of FIG. 24.

Referring to FIGS. 25 and 26, to perform deposit transaction of a medium, the medium may be accepted into a medium depositing space of the medium depositing and withdrawing module 20.

The media accepted into the medium depositing space may be separated by a sheet of media by a medium separation device. The media separated by a sheet of media may be transferred into the first transfer module 31. The first transfer module 31 may guide the medium to be deposited to the discrimination module 25.

The medium that is determined as normal by the discrimination module 25 may be transferred to the temporary stacking module 78 by the second transfer module 33, the eleventh transfer module 82, and the twelfth transfer module 83.

On the other hand, the medium that is determined as abnormal by the discrimination module 25 or the medium that is not recognized by the discrimination module 25 may be transferred to the medium depositing and withdrawing module 20 by the second transfer module 33 and the eleventh transfer module 82.

When the first deposit process is completed, information of the medium that is completely discriminated and stacked in the temporary stacking module 78 and information of the medium that is returned to the medium depositing and withdrawing module 20 may be displayed on the user interface 16.

Also, a deposit confirmation command or deposit cancel command with respect to the medium stacked in the temporary stacking module 78 may be inputted through the user interface 16.

If the deposit confirmation command is inputted through the user interface 16, the medium stacked in the temporary stacking module 78 may be separated by a medium separation device (not shown). The medium separated by the medium separation device may be transferred to the second transfer module 33 by the thirteenth transfer module 84 and the eleventh transfer module 82. The medium transferred to the second transfer module 33 may be transferred to the third path 23 defined by the medium depositing and withdrawing module 20. The medium transferred to the third path 23 may pass again through the discrimination module 25 via the first transfer module 31.

The medium passing through the discrimination module 25 may be transferred to the twelfth transfer module 83 via the second transfer module 33 and the eleventh transfer module 82.

The medium that is determined as normal among the media passing again through the discrimination module 25 may be transferred to one module of the first to third medium storage modules 51 to 54 after being transferred from the twelfth transfer module 83 to the fourth transfer module 41.

On the other hand, the medium that is determined as abnormal or the medium that is not recognized by the discrimination module 25 among the media passing again through the discrimination module 25 may be finally transferred to the collection module 86 after being transferred from the twelfth transfer module 83 to the fourteenth transfer module 85.

When the deposit cancel command is inputted through the user interface 16, the media stacked in the temporary stacking module 78 may be separated from each other by the medium separation device (not shown). The medium separated by the medium separation device may return to the medium depositing and withdrawing module 20 via the thirteenth transfer module 84, the eleventh transfer module 82, and the second transfer module 33.

Figure 27:
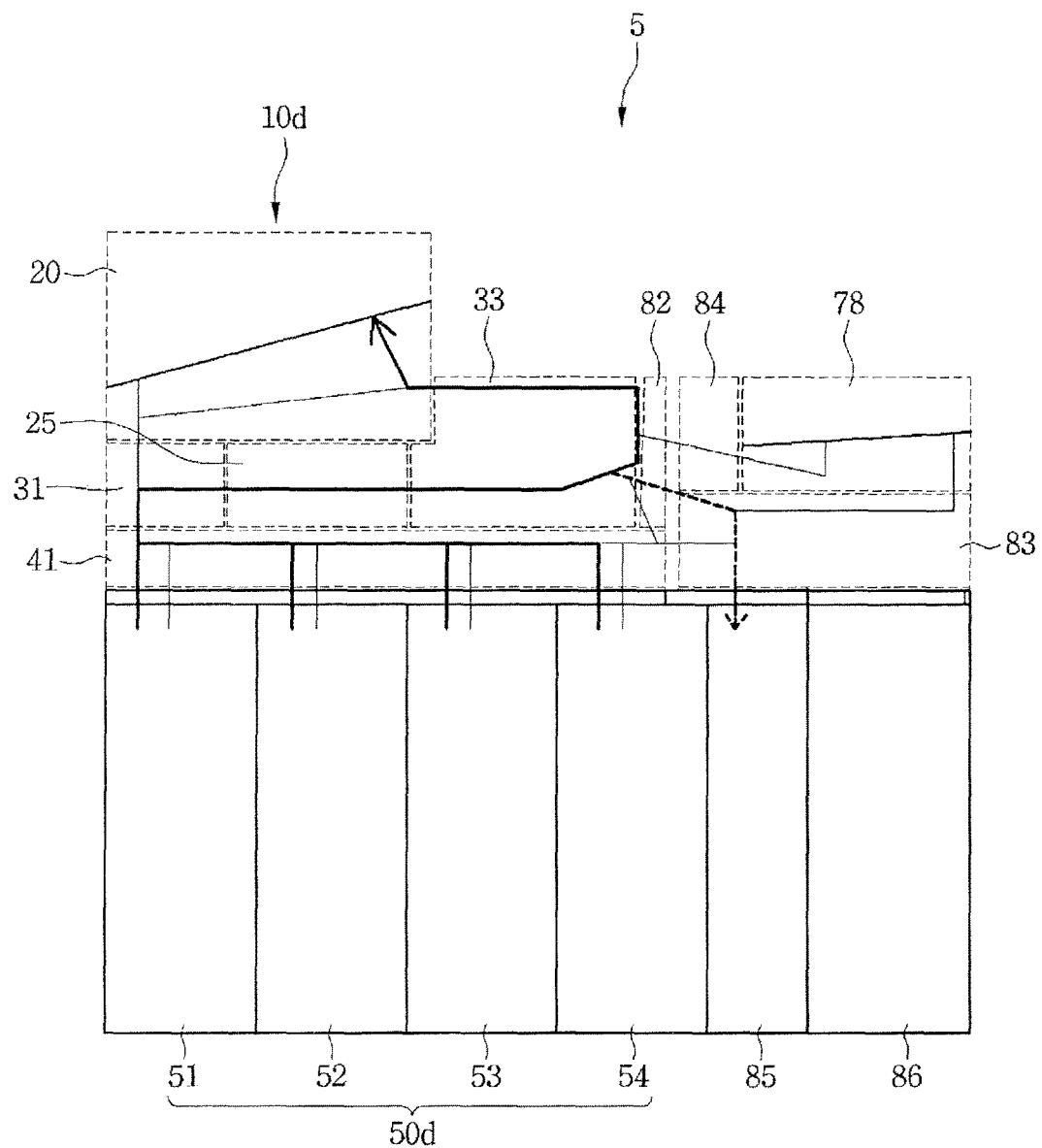
FIG. 27 is a schematic view illustrating a withdrawal process of the financial device of FIG. 24.

FIG. 27 is a schematic view illustrating a withdrawing process of the financial device of FIG. 24.

Referring to FIG. 27, when the medium withdrawal command is inputted through the user interface 16, a kind and the number of medium corresponding to the sum of the medium to be withdrawn may be discharged from the medium storage unit 50d. The medium discharged from the medium storage unit 50d may be transferred to the first transfer module 31 via the fourth transfer module 41. The medium transferred to the first transfer module 31 may pass through the discrimination module 25.

The medium determined as normal among the media passing through the discrimination module 25 may be discharged into the medium depositing and withdrawing module 20 by the second and eleventh transfer modules 33 and 82.

On the other hand, the medium that is determined as abnormal or the medium that is not recognized by the discrimination module 25 among the media passing through the discrimination module 25 may be collected to the collection module 86 via the second, eleventh, twelfth, and fourteenth modules 33, 82, 83, and 85.

Figure 28:
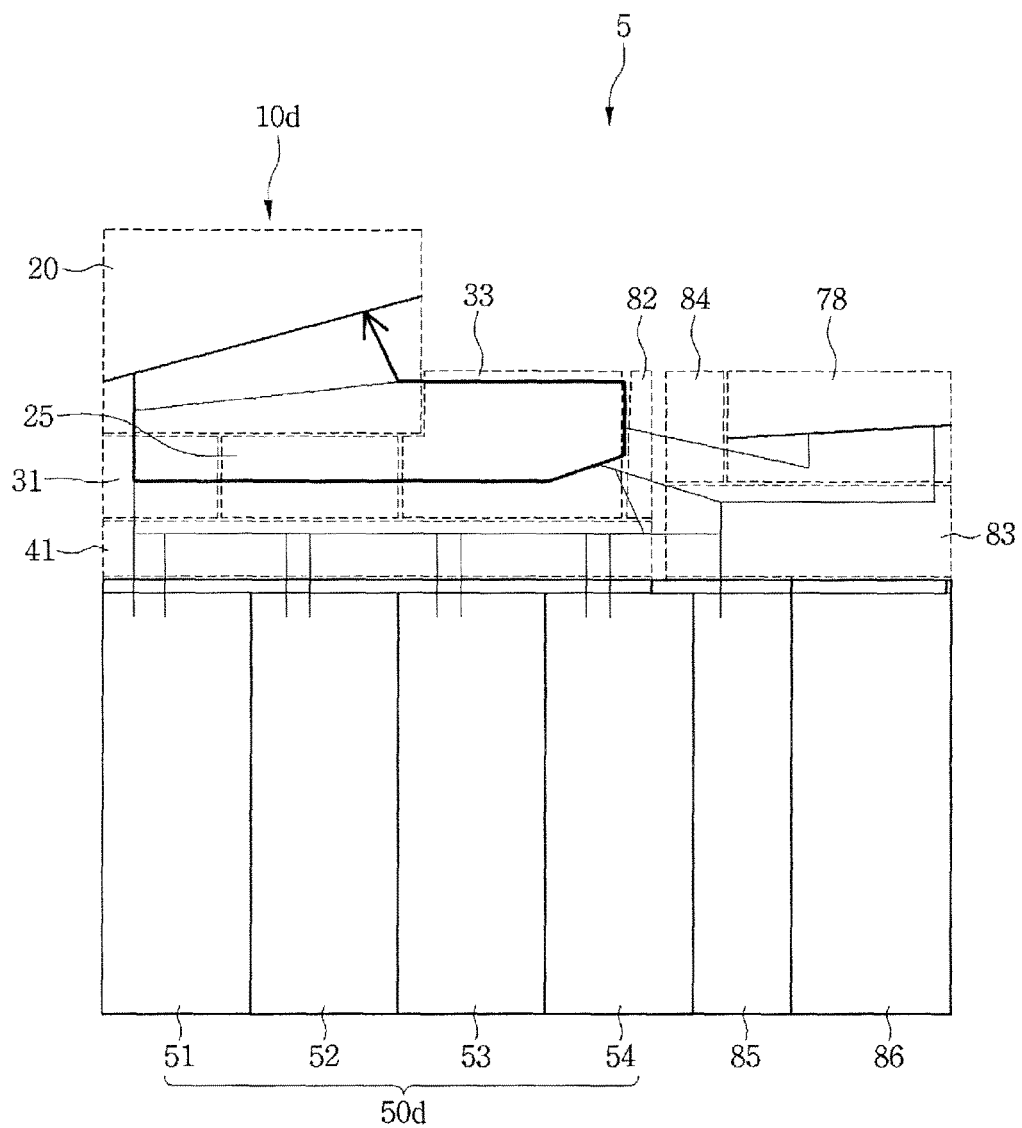
FIG. 28 is a schematic view illustrating a process of counting media in the financial device of FIG. 24.

FIG. 28 is a schematic view illustrating a process of counting media in the financial device of FIG. 24.

Referring to FIG. 28, a medium may be accepted into a first space of the medium receiving space of the medium depositing and withdrawing module 20.

The medium accepted into the first space may be transferred to the discrimination module 25 by the first transfer module 31.

The medium passing through the discrimination module 25 may be transferred into a second space of the medium receiving space of the medium depositing and withdrawing module 20 by the second transfer module 33 and the eleventh transfer module 82.

Here, when the temporary stacking module 78 is omitted in the financial device 5, a flow of the medium in FIG. 24 may be equal to that of the medium in the path in the first deposit transaction process. Also, the medium that is determined as abnormal or is not recognized by the discrimination module 25 among the media passing through the discrimination module 25 may be transferred into a third space different from the second space.

In FIGS. 24 to 28, the terms "eleventh" to "fourteenth" may be used for distinguishing the transfer modules of the financial devices having the first to fourth configurations. That is, in the financial device having the fifth configuration, it may be understood that the eleventh transfer module 82 acts as the third transfer module, and the twelfth transfer module 83 acts as the fifth transfer module. Also, it may be understood that the thirteenth transfer module 84 acts as the sixth transfer module, and the fourteenth transfer module acts as the seventh transfer module 85.

Even though the financial device changes in configuration, the common modules may be used regardless of the changed configuration to improve compatibility of the modules.

Thus, since it is unnecessary to newly design and manufacture the modules for each of the financial devices, manufacturing costs may be reduced.

Although the second transfer module and the third transfer module are provided as separate modules in the foregoing embodiment, the second transfer module and the third transfer module may be provided as a single module.

Thus, the second transfer module and the third transfer module may be commonly called a first connection module. Also, the fourth transfer module may be called a second connection module connected to the medium storage unit.

Also, the modules of the first and second connection modules, which is commonly used regardless of the configuration of the financial device may be called common transfer modules.

Although not limited thereto, the common transfer modules may comprise the first transfer module, the second transfer module, and the fourth transfer module.

Even though all the elements of the embodiments are coupled into one or operated in the combined state, the present disclosure is not limited to such an embodiment. That is, all the elements may be selectively combined with each other without departing the scope of the disclosure. Furthermore, when it is described that one comprises (or includes or has) some elements, it should be understood that it may comprise (or include or have) only those elements, or it may comprise (or include or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

According to the proposed embodiment, even though the financial device changes in configuration, the common modules may be used regardless of the changed configuration to improve the compatibility of the modules. Thus, since it is unnecessary to newly design and manufacture the modules for each of the financial devices, the manufacturing costs may be reduced.

Also, since the temporary stacking module is disposed at the rear side of the medium depositing and withdrawing module, the transfer path through which the medium has to be transferred to the medium depositing and withdrawing module to allow the media stacked in the temporary stacking module to return and the transfer path through which the medium has to be transferred to the discrimination module to perform the second deposit process may be reduced in length.

Also, the additional function module for replenishing and/or collecting the medium may be disposed at the most rear side of the financial device. Thus, the teller or manager who opens the door may easily access the additional function module.

Also, since the additional function module is accommodated in the cash box, the safety of the additional function module may be improved.

Although embodiments have been described with reference to a number of illustrative embodiments thereof, it will be understood by those skilled in the art that various changes in form and details may be made therein without departing from the spirit and scope of the invention. Therefore, the preferred embodiments should be considered in descriptive sense only and not for purposes of limitation, and also the technical scope of the invention is not limited to the embodiments. Furthermore, all differences within the scope will be construed as being comprised by the amended claims.

What is claimed is:
1. A financial device comprising:
a medium depositing and withdrawing module having a medium receiving space to receive a medium;
a discrimination module to discriminate the medium;
a temporary stacking module to temporarily stack the medium;

a medium storage unit to store at least one of media to be accepted into the medium receiving space and media to be withdrawn; and
a transfer module to guide the medium to the medium storage unit or a medium discharged from the medium storage unit,
wherein the transfer module comprises:
a first transfer module to guide the medium of the medium depositing and withdrawing module to the discrimination module;
a first connection module to transfer the medium between the discrimination module and the temporary stacking module; and
a second connection module to guide the medium passing through the first connection module to the medium storage unit,
wherein the temporary stacking module is disposed vertically above the first connection module, and
wherein a portion of the transfer module is changeable or replaceable to install or remove an additional function module which performs at least one function of a replenishment function to replenish a medium to the medium storage unit and a collection function to collect the medium from the medium storage unit.

2. The financial device of claim 1, wherein the transfer module comprises a common transfer module which is used regardless of a configuration of the financial device,
wherein, in the configuration of the financial device where the additional function module is installed, a first detachable transfer module is connected to the common transfer module, and
in the configuration of the financial device where the additional function module is removed, the first detachable transfer module is removed.

3. The financial device of claim 2, further comprising a collection module to collect the medium and a second detachable transfer module to guide the medium to the collection module,
wherein, in the configuration of the financial device where the additional function module is removed, the collection module and the second detachable transfer module to guide the medium to the collection module are removed.

4. The financial device of claim 3, wherein the first detachable transfer module is connected to the second detachable transfer module to guide the medium to the collection module.

5. The financial device of claim 4, wherein the additional function module is disposed above the collection module.

6. The financial device of claim 3, wherein the additional function module is replaced with a plurality of collection modules to collect the medium, and
the first detachable additional transfer module is replaced with a third detachable transfer module having plural branch paths through which the medium is transferrable each of the plurality of collection modules.

7. The financial device of claim 6, wherein the transfer module comprises a common transfer module which is used regardless of a configuration of the financial device, and
in the configuration of the financial device where the collection module to collect the medium is installed, a fourth detachable transfer module to connect the collection module to the common transfer module is additionally provided.

8. The financial device of claim 7, wherein the medium storage unit comprises a plurality of medium storage modules to store media,
the collection module is provided in plurality,
the common transfer module is connected to a portion of the plurality of medium storage modules, and
the fourth detachable transfer module is connected to the other portion of the plurality of medium storage modules.

9. The financial device of claim 7, wherein the additional function module is disposed above the collection module.

10. The financial device of claim 7, wherein a portion of the transfer module is changed to change a position of the temporary stacking module.

11. The financial device of claim 10, wherein the transfer module comprises a common transfer module which is used regardless of a configuration of the financial device, and
in the configuration of the financial device where the position of the temporary stacking module is changed, a fifth detachable transfer module connecting the common transfer module to the temporary stacking module is additionally installed.

12. The financial device of claim 10, further comprising a collection module to collect the medium and installed under the temporary stacking module.

13. A financial device comprising:
a medium depositing and withdrawing module having a medium receiving space to receive a medium;
a discrimination module to discriminate the medium;
a first transfer module to guide the medium of the medium depositing and withdrawing module to the discrimination module;
a temporary stacking module in which a medium to be withdrawn, wherein the medium passes through the discrimination module, is temporarily stacked;
a first connection module to transfer the medium between the discrimination module and the temporary stacking module;
a medium storage unit to store the medium to be deposited and the medium to be withdrawn; and
a second connection module to guide the medium passing through the first connection module to the medium storage unit,
wherein the temporary stacking module is disposed above the first connection module, the first connection module is disposed above the second connection module, and the second connection module is disposed above the medium storage unit,
wherein the temporary stacking module, the first connection module, the second connection module, and the medium storage unit are disposed to vertically overlap each other, and
wherein the medium depositing and withdrawing module, the discrimination module, the second connection module, and the medium storage unit are disposed to vertically overlap with each other.

14. The financial device of claim 13, wherein at least a portion of the temporary stacking module is disposed to horizontally overlap with the medium depositing and withdrawing module, and
the medium to be deposited to the medium depositing and withdrawing module is transferred to the temporary stacking module where the medium does not pass between the medium depositing and withdrawing module and the temporary stacking module.

15. The financial device of claim 14, wherein the whole of the temporary stacking module is disposed to horizontally overlap with the medium depositing and withdrawing module.

16. The financial device of claim 13, wherein the temporary stacking module comprises an introduction path through which the medium is accepted and a withdrawal path through which the medium is withdrawn, and
in the temporary stacking module, the medium is stacked in a standup state to allow a long side having a long length thereof to be supported by a stacking surface.

17. The financial device of claim 16, wherein the first connection module comprises a second transfer module to transfer the medium from the discrimination module and a third transfer module to transfer the medium transferred from the second transfer module.

18. The financial device of claim 17, wherein the temporary stacking module is disposed to vertically overlap with at least a portion of each of the second transfer module and the third transfer module.

19. The financial device of claim 17, wherein the medium depositing and withdrawing module comprises a first path to transfer the medium in the medium receiving space to the first transfer module, a second path through which the medium to be stacked in the medium receiving space is transferred, and a third path through which the medium discharged from the temporary stacking module and transferred to the medium storage unit is transferred.

20. The financial device of claim 19, wherein the second transfer module comprises a fourth path connected to the discrimination module and a fifth path connected to the introduction path of the temporary stacking module.

21. The financial device of claim 20, wherein the second or third transfer module exclusively defines a guide path connecting the fourth path to the fifth path, or the second and third transfer modules define the guide path together.

22. The financial device of claim 17, wherein the third transfer module guides the medium transferred from the second transfer module to the second connection module.

23. The financial device of claim 22, further comprising a collection module to collect the medium that is determined as abnormal by the discrimination module or a medium that is not recognized by the discrimination module,
wherein the collection module is disposed under the second connection module to vertically overlap with at least a portion of the second connection module and at least a portion of the temporary stacking module.

24. The financial device of claim 17, further comprising a fifth transfer module to guide the medium of the third transfer module to the second connection module.

25. The financial device of claim 24, further comprising:
a sixth transfer module disposed above the fifth transfer module and at a rear side of the temporary stacking module; and
an additional function module disposed at a rear side of the sixth transfer module to store at least one of a medium to be replenished to the medium storage unit and a medium collected from the medium storage unit,
wherein at least a portion of the sixth transfer module is disposed between the temporary stacking module and the additional function module.

26. The financial device of claim 25, further comprising a seventh module disposed under the fifth transfer module to transfer the medium transferred from the fifth transfer module; and
a collection module to collect the medium that is determined as abnormal or the medium that is not recognized by the discrimination module among media passing through the discrimination module,
wherein the collection module is disposed under the additional function module to vertically overlap with at least a portion of the additional function module.

27. The financial device of claim 26, wherein paths for respectively transferring media to an untaken medium collection part and the collection module are branched from a path between the second transfer module and the additional function module.

28. The financial device of claim 26, wherein the medium to be replenished, which is withdrawn from the additional function module passes through the sixth transfer module, the third transfer module, the second transfer module, and the first transfer module, and
the medium that is determined as normal among media to be replenished, which pass through the discrimination module passes through the second transfer module, the third transfer module, the fifth transfer module, and the fourth transfer module and is stacked in the medium storage unit.

29. The financial device of claim 28, wherein the medium that is determined as abnormal or is not recognized by the discrimination module among the media to be replenished, which pass through the discrimination module is collected to the collection module via the second transfer module, the third transfer module, the fifth transfer module, and a seventh transfer module.

30. The financial device of claim 26, wherein the medium to be collected, which is withdrawn from the medium storage unit passes through the discrimination module via the fourth transfer module and the first transfer module, and
the medium that is determined as normal among media to be collected, which passes through the discrimination module is collected to the additional function module via the second transfer module, the third transfer module, and the sixth transfer module.

31. The financial device of claim 30, wherein the medium that is determined as abnormal or is not recognized by the discrimination module among the media passing through the discrimination module is collected to the collection module via the second transfer module, the third transfer module, a fifth transfer module, and a seventh transfer module.

32. The financial device of claim 26, wherein the sixth transfer module further comprises a collection part to collect a medium that is not taken by a customer even though the medium is received into the medium depositing and withdrawing module.

33. The financial device of claim 32, wherein the medium that is not taken by the customer even though the medium is received into the medium depositing and withdrawing module is transferred to the discrimination module via the first transfer module,
the untaken medium passing through the discrimination module is collected to the collection part by the sixth transfer module via the second transfer module and the third transfer module.

34. The financial device of claim 17, further comprising:
an eighth transfer module to guide the medium of the third transfer module to the second connection module; and
a collection module disposed under the eighth transfer module to collect the medium.

35. The financial device of claim 34, wherein the eighth transfer module is disposed above the medium storage unit to vertically overlap with at least a portion of the medium storage unit and at least a portion of the collection module.

36. The financial device of claim 35, wherein the medium storage unit comprises the plurality of medium storage modules, and one kind of medium is directly transferred to one module of the plurality of medium storage modules by the eighth transfer module, and another kind of medium is transferred to the other module of the plurality of medium storage modules after being transferred from the eighth transfer module to the second connection module according to kinds of media accepted into the medium depositing and withdrawing module.

37. The financial device of claim 35, wherein the medium that is determined as abnormal or is not recognized by the discrimination module among the media passing through the discrimination module is collected to the collection module via the second transfer module, the third transfer module, and the eighth transfer module.

38. The financial device of claim 34, further comprising:
a ninth transfer module disposed above the eighth transfer module and at a rear side of the temporary stacking module; and
an additional collection module disposed at a rear side of the ninth transfer module to collection the medium.

39. The financial device of claim 38, wherein the medium that is not taken by a customer even though the medium is received into the medium depositing and withdrawing module is transferred to the discrimination module via the first transfer module, and
the untaken medium passing through the discrimination module is collected to the at least one additional collection module via the second transfer module, the third transfer module, and the ninth transfer module.

40. The financial device of claim 39, wherein the at least one additional collection module is disposed above the eighth transfer module, and
at least a portion of the eighth transfer module is disposed between the collection module and the at least one additional collection module.

41. The financial device of claim 38, further comprising:
a tenth transfer module to transfer the medium transferred from the third transfer module to the second connection module;
an additional function module disposed under the tenth transfer module to store at least one of the medium to be replenished to the medium storage unit and the medium to be collected from the medium storage unit; and
at least one collection module disposed between the additional function module and the medium storage unit.

42. The financial device of claim 41, wherein media to be replenished, which are withdrawn from the additional function module passes through the discrimination module via the tenth transfer module, the third transfer module, the second transfer module, and the first transfer module, and
a medium that is determined as normal among the media to be replenished, which passes through the discrimination module is stacked in the medium storage unit via the second transfer module, the third transfer module, the tenth transfer module, and the fourth transfer module.

43. The financial device of claim 42, wherein the medium that is determined as abnormal or is not recognized by the discrimination module among the media to be replenished, which passes through the discrimination module is directly collected to at least one collection module by the tenth transfer module after passing through the second transfer module and the third transfer module or collected to the at least one collection module after being transferred to the fourth transfer module by the tenth transfer module.

44. The financial device of claim 41, wherein media to be collected, which are withdrawn from the medium storage unit pass through the discrimination module via the fourth transfer module and the first transfer module, and
a medium that is determined as normal among the media to be collected, which passes through the discrimination module is collected to the additional function module via the second transfer module, the third transfer module, and the tenth transfer module.

45. The financial device of claim 44, wherein a medium that is determined as abnormal or is not recognized by the discrimination module among the media to be collected, which passes through the discrimination module passes through the second transfer module and the third transfer module, and then directly collected to at least one collection module by the tenth transfer module after passing through the second transfer module and the third transfer module or collected to the at least one collection module after being transferred to the fourth transfer module by the tenth transfer module.

46. The financial device of claim 41, wherein a medium that is not taken by a customer even though the medium is received into the medium depositing and withdrawing module is transferred to the discrimination module via the first transfer module, and
the untaken medium passing through the discrimination module passes through the second transfer module and the third transfer module, and then collected to at least one collection module by the tenth transfer module after passing through the second transfer module and the third transfer module or collected to the at least one collection module after being transferred to the fourth transfer module by the tenth transfer module.

47. A financial device comprising:
a medium depositing and withdrawing module having a medium receiving space to receive a medium;
a discrimination module to discriminate the medium;
a first transfer module to guide the medium of the medium depositing and withdrawing module to the discrimination module;
a second transfer module to transfer the medium passing through the discrimination module;
a third transfer module to transfer the medium passing through the second transfer module;
a fourth transfer module disposed under the discrimination module to transfer the medium passing through the third transfer module;
a medium storage unit to store the medium transferred from the fourth transfer module, the medium storage unit to transfer the stored medium to the fourth transfer module;
a temporary stacking module in which the medium to be withdrawn, wherein the medium passes through the discrimination module, is temporarily stacked; and
a fifth transfer module to guide the medium passing through the third transfer module to the fourth transfer module and the temporary stacking module,
wherein the medium depositing and withdrawing module, the discrimination module, the fourth transfer module, and the medium storage unit are disposed to vertically overlap with each other.

48. The financial device of claim 47, further comprising a sixth transfer module to guide the medium discharged from the temporary stacking module to the third transfer module.

49. The financial device of claim 48, wherein the sixth transfer module is disposed above the fifth transfer module to vertically overlap with at least a portion of the fifth transfer module.

50. The financial device of claim 48, wherein the fifth transfer module is disposed under the temporary stacking module and at a rear side of the fourth transfer module to vertically overlap with at least a portion of the temporary stacking module.

51. The financial device of claim 48, further comprising a collection module disposed under the fifth transfer module and horizontally arranged with respect to the medium storage unit to collect the medium transferred from the fifth transfer module.

52. The financial device of claim 48, wherein at least a portion of each of the third transfer module and the sixth transfer module is disposed between the second transfer module and the temporary stacking module.

53. The financial device of claim 48, wherein the medium accepted into the medium depositing and withdrawing module is transferred to the discrimination module via the first transfer module, and the medium passing through the discrimination module is transferred to the temporary stacking module via the second transfer module, the third transfer module, and the fifth transfer module.

54. The financial device of claim 53, wherein the medium discharged from the temporary stacking module is transferred again to the discrimination module via the sixth transfer module, the third transfer module, the second transfer module, and the first transfer module, and the medium passing again through the discrimination module is stacked in the medium storage unit via the second transfer module, the third transfer module, the fifth transfer module, and the fourth transfer module.

* * * * *